(12) United States Patent
Ikenishi et al.

(10) Patent No.: US 9,868,661 B2
(45) Date of Patent: Jan. 16, 2018

(54) GLASS LENS BLANK FOR POLISHING, MANUFACTURING METHOD THEREFORE, AND OPTICAL LENS MANUFACTURING METHOD

(71) Applicants: Mikio Ikenishi, Tokyo (JP); Akihiro Shoji, Tokyo (JP); Yoshitake Tanno, Tokyo (JP); Isao Tanaka, Tokyo (JP)

(72) Inventors: Mikio Ikenishi, Tokyo (JP); Akihiro Shoji, Tokyo (JP); Yoshitake Tanno, Tokyo (JP); Isao Tanaka, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 178 days.

(21) Appl. No.: 14/768,161

(22) PCT Filed: Feb. 25, 2014

(86) PCT No.: PCT/JP2014/054561
§ 371 (c)(1),
(2) Date: Aug. 14, 2015

(87) PCT Pub. No.: WO2014/129657
PCT Pub. Date: Aug. 28, 2014

(65) Prior Publication Data
US 2016/0039703 A1    Feb. 11, 2016

(30) Foreign Application Priority Data

Feb. 25, 2013 (JP) .................................. 2013-034233
Oct. 30, 2013 (WO) .................. PCT/JP2013/079409
Dec. 12, 2013 (WO) .................. PCT/JP2013/083343

(51) Int. Cl.
*C03B 11/08* (2006.01)
*B24B 13/00* (2006.01)
*C03B 19/02* (2006.01)

(52) U.S. Cl.
CPC .............. *C03B 11/08* (2013.01); *B24B 13/00* (2013.01); *B24B 13/0037* (2013.01);
(Continued)

(58) Field of Classification Search
CPC ..... B24B 13/00; B24B 13/0037; C02B 11/08; C02B 19/02; C02B 2215/03;
(Continued)

(56) References Cited

U.S. PATENT DOCUMENTS 6,595,026 B1    7/2003 Tsukada
2005/0210923 A1    9/2005 Yamashita et al.
(Continued)

FOREIGN PATENT DOCUMENTS

JP    H11 171555 A    6/1999
JP    2000-302473 A   10/2000
(Continued)

OTHER PUBLICATIONS

Aug. 25, 2015 International Preliminary Report on Patentability issued in Japanese Patent Application No. PCT/JP2014/054561.
(Continued)

*Primary Examiner* — Timothy V Eley
(74) *Attorney, Agent, or Firm* — Oliff PLC

(57) ABSTRACT

A glass lens blank for polishing in which a thickness of a defect-containing layer is suppressed to a minimum and thus it is possible to shorten the processing time required for grinding and polishing the glass lens blank for polishing after press-molding, a method of manufacturing the same, and a method of manufacturing an optical lens. A glass lens blank for polishing of which at least a main surface is a press-molding surface, wherein a defect-containing layer formed on the main surface has a thickness of 50 μm or less.

17 Claims, 8 Drawing Sheets

(52) U.S. Cl.
CPC .......... *C03B 19/02* (2013.01); *C03B 2215/03* (2013.01); *C03B 2215/46* (2013.01); *C03B 2215/47* (2013.01); *C03B 2215/61* (2013.01); *C03B 2215/68* (2013.01); *C03B 2215/72* (2013.01); *Y02P 40/57* (2015.11)

(58) Field of Classification Search
CPC ............ C02B 2215/46; C02B 2215/47; C02B 2215/61; C02B 2215/72
See application file for complete search history.

(56) References Cited

U.S. PATENT DOCUMENTS

| | | | | |
|---|---|---|---|---|
| 2011/0162412 | A1* | 7/2011 | Fukumoto | C03B 11/086 65/66 |
| 2011/0215492 | A1* | 9/2011 | Tomisaka | B24B 13/0052 264/1.21 |
| 2012/0006062 | A1* | 1/2012 | Nakagawa | C03B 11/08 65/66 |
| 2012/0128937 | A1* | 5/2012 | Imajima | C03B 11/08 428/156 |
| 2014/0165655 | A1* | 6/2014 | Nakagawa | C03B 7/14 65/66 |

FOREIGN PATENT DOCUMENTS

| | | |
|---|---|---|
| JP | 2001-002427 A | 1/2001 |
| JP | 2001-019446 A | 1/2001 |
| JP | 2005-272292 A | 10/2005 |

OTHER PUBLICATIONS

Jun. 10, 2014 International Search Report issued in Application No. PCT/JP2014/054561.

* cited by examiner

GLASS LENS BLANK FOR POLISHING, MANUFACTURING METHOD THEREFORE, AND OPTICAL LENS MANUFACTURING METHOD

BACKGROUND OF THE INVENTION

1. Field of the Invention

The present invention relates to a glass lens blank for polishing, a method of manufacturing the same, and a method of manufacturing an optical lens.

2. Description of Related Art

As a method of manufacturing a lens, the following method has been known. That is, square-shaped or plate-shaped glass blocks are prepared by flowing a molten glass into a mold, and then these glass blocks are cut and subdivided by a mechanical processing to thereby produce cut pieces. Subsequently, together with equalizing the weight of each of the cut pieces, a rough-polishing processing (barrel polishing) is performed on the surfaces thereof so as to facilitate adhering a release agent. Thereafter, the rough-polished cut pieces are softened by reheating, and the softened glass is press-molded to thereby mold a lens blank having a shape approximating to a lens shape. Finally, the lens blank is ground and polished to manufacture a lens.

According to this method, if plate-shaped glass blocks of a plurality of glass types are prepared and stored, it is possible to cut the plate-shaped glass block to a desired quantity and volume as necessary and press the cut pieces thereof. Accordingly, the method is suitable for small amount of a wide variety products. However, in this method, on a surface of the lens blank after press-processing the cut pieces, a defect-containing layer is formed in a thickness of 60~500 μm. The defect-containing layer includes portions in which glass component is altered due to contacts with cracks occurred during the rough-polishing processing or a processing solution, or a crystallized portion generated from the time of softening to the time of press-molding. Furthermore, when softening the cut pieces, a phenomenon is caused that each corner is folded into inside the glass, and its folded amount reaches to 300 μm or more, such that this sometimes occurs in a deep portion as the defect-containing layer.

If such a defect-containing layer (including folded portions) is formed on a surface of the glass blank, when in a subsequent step, trying to manufacture a lens having a smooth surface without irregularities together with removing the defect-containing layer, it is necessary to perform grinding and polishing of 500 μm or more, and as a result unnecessary use of materials is generated together with grinding and polishing time being longer.

Recently, as disclosed in Patent Document 1 (Japanese Patent No. 3806288) below, there has been also proposed a method of manufacturing a glass lens blank for polishing by steps as follows. That is, this method comprises a step of receiving and molding a molten glass supplied to be from a nozzle with a mold to obtain a glass gob, a step of rough-polishing processing a surface of the glass gob, a step of forming a powderary release agent on the surface of the glass gob, and a step of reheating and press-molding the glass gob.

In this method, since occurrence of angulated portions such as the cut pieces may be suppressed on the surface of the glass gob, it is possible to perform a molding without causing the folded portions in the next reheating step. However, also in this method, a defect-containing layer is formed in a thickness of the order of 60~150 μm as the above. Further, in the fact of being capable of manufacturing a number of glass gobs and storing them as a stock, this method enables a wide variety productions by press-molding a plurality of glass gobs having a same shape with a plurality of molds having different molding surfaces upon an order.

In any conventional methods, since in the case of grinding and polishing the glass lens blank for polishing after press-molding into the lens, the processing time required for grinding and polishing occupies about half of the entire process for an optical lens, a reduction in the processing time has been demanded. Further, if the thickness of the defect-containing layer on the surface of the glass lens blank for polishing is reduced, it is expected that it is possible to reduce the processing time required for grinding and polishing; however, in the conventional methods, a glass lens blank for polishing having a thickness of the defect-containing layer of 50 μm or less has not been achieved. In particular, as for a glass lens blank for polishing that is a basis for a medium- or large-diameter lens to be used in a single-lens reflex or the like, in the conventional methods, it has been considered that it is impossible to manufacture a thin glass lens blank for polishing having a thickness of the defect-containing layer of 50 μm or less.

CITATION LIST

Patent Document (Patent Document 1) Japanese Patent No. 3806288

SUMMARY OF THE INVENTION

Problem to be Solved by the Invention

The present invention has been made in consideration of the above circumstances, and its object is to provide a glass lens blank for polishing in which a thickness of the defect-containing layer can be suppressed to a minimum and thus a processing time can be reduced, which is required for grinding and polishing of the glass lens blank for polishing after press-molding, a method of manufacturing the same, and a method of manufacturing an optical lens.

Mean for Solving the Problems

As a result of intensive studies for reducing the processing time required for grinding and polishing of the glass lens blank for polishing after press-molding, inventors of the present invention have found out, for the first time, that, in the glass lens blanks for polishing to be obtained by a method which is not bound by conventional wisdom, the thickness of the defect-containing layer to be formed on the entire surface of a surface layer become 50 μm or less, and thus have completed the present invention.

In other words, a glass lens blank for polishing according to the present invention is characterized in that at least a main surface thereof is a press-molded surface, wherein a thickness of the defect-containing layer to be formed on the main surface is 50 μm or less.

In that as for a glass lens blank for polishing according to the present invention, the thickness of the defect-containing layer is 50 μm or less, spherical grinding (generation grinding) and polishing are performed on this glass lens blank for polishing, thereby allowing to extremely reduce the processing time required for grinding and polishing to obtain an optical lens.

For example, as for a lens blank of the present invention, as compared with the glass lens blank for polishing to be obtained by the conventional cut pieces method, it is possible to reduce the processing time required for grinding and polishing to obtain an optical lens by approximately a half or less. Also, as for a glass lens blank for polishing according to the present invention, as compared with a lens blank to be obtained by the method shown in Patent Document 1 (Japanese Patent No. 3806288), it is possible to reduce the processing time required for grinding and polishing to obtain an optical lens by approximately a half or less.

Further, in that as for a glass lens blank for polishing according to the present invention, the thickness of the defect-containing layer is 50 µm or less, grinding waste and polishing waste generated upon grinding and polishing to obtain an optical lens can be minimized, thereby removing unnecessary use of materials. In addition, since a processing amount is small, a shape precision (including a thickness precision) of an optical lens is also improved.

A method of manufacturing a glass lens blank for polishing of the present invention preferably comprises, but is not particularly limited to, the steps of: receiving and molding a molten glass to be supplied from a nozzle with a mold for molding a glass gob to obtain the glass gob; and reheating the glass gob and press-molding it with the mold for press-molding.

Preferably, after obtaining the glass gob to press-molding, the method does not have a step of roughening (barrel polishing, etc.) the surface of the glass gob.

Preferably, after obtaining the glass gob to press-molding, the method does not have a step of grinding or polishing the glass gob.

In the case that a glass lens blank for polishing has preferably a weight of 5 grams or more, more preferably of 10 grams or more, action effects of the present invention is greater. The glass lens blank for polishing of the present invention is particularly suitable for molding a glass lens having a medium diameter or a large diameter (e.g., a lens diameter of 30 mm or more).

A method of manufacturing an optical lens according to the present invention is characterized by performing a spherical grinding (generation grinding) processing (hereinafter, also referred to as a CG (Curve Generating) processing) and smoothing processing on the above-described glass lens blank for polishing, wherein the smoothing processing is performed using a resin-bonded grindstone without using a metal-bonded grindstone to thereby obtain an optical lens.

A method of manufacturing a glass lens blank for polishing according to another aspect of the present invention comprises the steps of: receiving and molding a molten glass to be supplied from a nozzle with the mold for molding a glass gob to obtain a glass gob; a step of reheating the glass gob into a viscosity from $10^4$ to $10^6$ dPa·s under an air atmosphere while maintaining a surface state of the glass gob; and press-molding the reheated glass gob with the mold for press-molding under an air atmosphere, thereby obtaining a glass-molded article having a press-molded surface on at least a main surface thereof, wherein a thickness of a defect-containing layer to be formed on the main surface of the glass-molded article obtained by the press-molding step is 50 µm or less.

Preferably, in a step of applying release agent, it is configured that the release agent is applied to holding recesses on which glass gobs will be placed, and then the glass gobs are placed on the holding recesses and the release agent is further applied to the glass gobs. With such a configuration, when softening the glass gobs in a heating furnace, the viscosity of the glass gob is reduced and thereby a height of the glass gob becomes lowered and a diameter thereof becomes extended, but the release agent on the glass gob is inserted around between the glass gob and the holding recess and thus the release agent encloses the glass gob. Accordingly, since a sufficient releasing effect can be achieved without performing a roughening processing of a surface of the glass gob as in Patent Document 1 (Japanese Patent No. 3806288), it is possible to suppress a thickness of a defect-containing layer to a minimum and thus reduce a processing time required for grinding and polishing thereafter.

Advantage of the Invention

According to the present invention, a glass lens blank for polishing can be provided wherein it is possible to extremely reduce a processing time required for grinding and polishing to obtain an optical lens.

DETAILED DESCRIPTION OF EXEMPLARY EMBODIMENTS

Figure 1A:
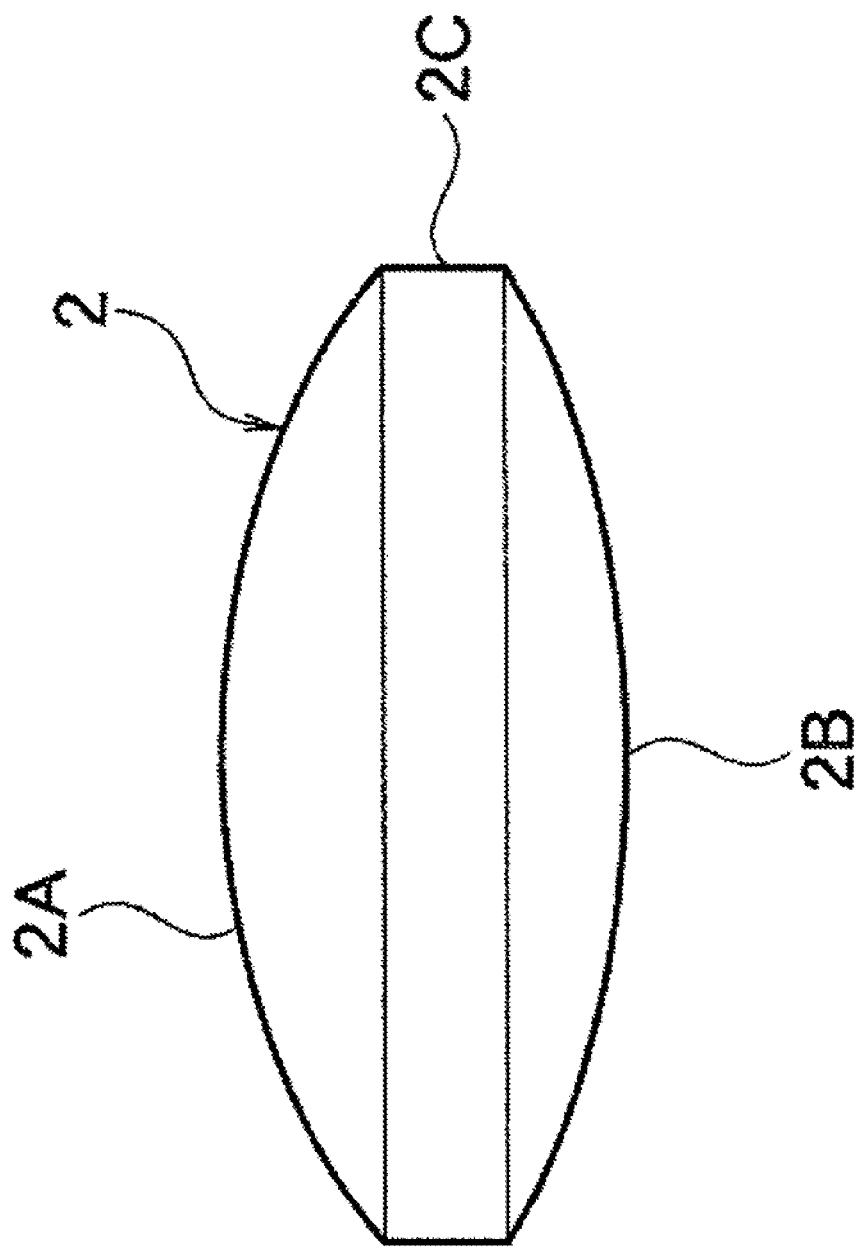
FIG. 1A is a side view showing an example of a shape of the glass lens blank for polishing according to one embodiment of the present invention.

Hereinafter, the present invention will be described based on embodiments shown in the drawings. Incidentally, the same reference numerals are given to the same or corresponding portions in the drawings, and the description thereof will not be repeated.

<Glass Lens Blanks for Polishing>

Figure 1B:
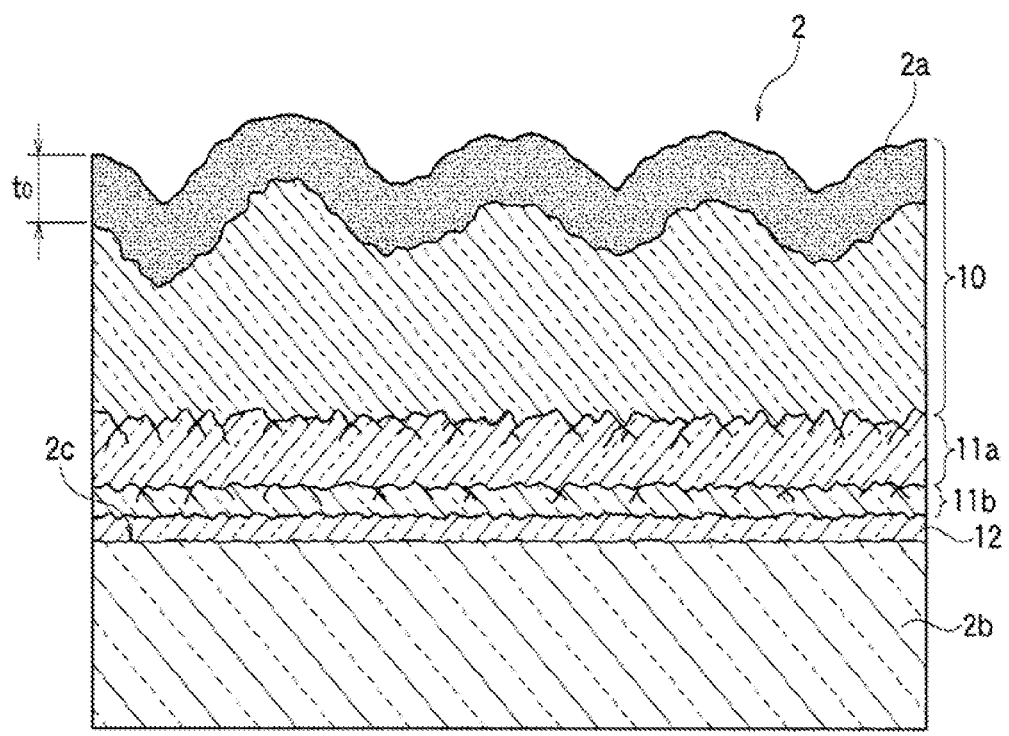
FIG. 1B is a schematic view schematically showing a portion to be removed by grinding and polishing, in a partial cross section of a surface of the glass lens blank for polishing shown in FIG. 1A.

FIG. 1A is a side view showing an example of a shape of the glass lens blank for polishing according to one embodiment of the present invention. FIG. 1B is a schematic view schematically showing a portion to be removed by grinding and polishing, in a partial cross section of a surface of the glass lens blank for polishing shown in FIG. 1A.

As shown in FIG. 1A, the glass lens blank for polishing 2 according to one embodiment of the present invention has approximately spherical press-molded surfaces 2A, 2B which will be main surfaces. These press-molded surfaces 2A, 2B are the surfaces to which the molding surface shapes of an upper mold 74 and a lower mold 72 are transferred (see FIG. 5). Although both of the surfaces 2A, 2B have a curved surface of a convex shape, the lens blank of the present invention may have, but is not particularly limited to, the surfaces either one or both of which may be a concave curved surface or a plane surface. Incidentally, the side peripheral surface 2C of the glass lens blank for polishing 2 may be a press-molded surface which is formed along the inner peripheral surface of the barrel mold 73, or it may be a free surface that does not abut on the barrel mold 73 (see FIG. 5).

This glass lens blank for polishing 2 will be made into an optical lens by performing a grinding processing and a polishing processing to be described later. On the main surfaces 2A, 2B of the lens blank 2 of the present embodiment, as shown in FIG. 1B, the defect-containing layer 2a has a thickness t0 of 50 μm or less, preferably of 30 μm or less, more preferably of 20 μm or less, and much more preferably of 15 μm or less. In the present embodiment, in that the glass lens blank 2 is manufactured by a manufacturing method to be described later, the defect-containing layer 2a is expected to have at least a thickness of 1 μm or more, but the defect-containing layer 2a have extremely thin thickness t0 as compared with the conventional manufacturing methods.

In this embodiment, the defect-containing layer 2a is a layer having the defects which form bright spots of reflected light, as compared with a bulk portion 2b (the portion to be made into an optical lens) of the glass lens blank 2. By removing this defect-containing layer 2a, the defects which form the bright spots of the reflected light are eliminated. Specific examples of the defects which form the bright spots of the reflected light include, for example, the crystallization portions or the like, generated from the reheating step and pressing step in the manufacturing method of the blank to be described later. It should be noted that in the glass lens blank 2 in the present embodiment, there are no folded portions derived from the cut pieces.

There is no particular limitation on a size and weight of the glass lens blank 2, but in the case that the glass lens blank for polishing has preferably a weight of 5 grams or more, and more preferably a weight of 10 grams or more, an action effect of the present invention is greater. The glass lens blank for polishing of the present invention is particularly suitable for molding a glass lens having a medium diameter or a large diameter. The reason is that since the processing time required for grinding and polishing of the glass lens having a medium diameter or a large diameter is longer than that of the glass lens having a small diameter, according to the present invention, this processing time can be reduced and furthermore the loss of material can be reduced. Therefore the effects of the present invention can be greatly achieved.

The glass lens blanks 2 of the present embodiment are manufactured by the manufacturing method to be described later, for example, in a number of 1000 or more at a time, but the weight variation thereof is +1.0% or less, in some cases 0.5%± or less. For instance, in the glass gob forming step to be described below, by improving the operation precision of the molding apparatus which controls a cutting timing, viscosity or the like of the molten glass flowing out of the nozzle at a constant rate, the weight variation can be reduced.

Further, in the glass lens blank for polishing 2 according to the present embodiment, the main surfaces 2A, 2B thereof has preferably a surface roughness Rz of 8 μm or more, more preferably of 10 μm or more, much more preferably of 12 μm or more, still more preferably of 20 μm or more, even still preferably of 22 μm or more, and even much more preferably of 25 μm or more. Such the glass lens blank 2 according to the present embodiment has moderate irregularities on the main surfaces (the surfaces to be processed) thereof, and thus it is possible to perform a good processing even when using a grindstone in which a grain diameter of abrasive grains is relatively small upon grinding processing such as a CG processing, and thereby the processing amount and processing time can be further reduced in subsequent processing steps (grinding and polishing processings).

Typically, in the grinding treatment such as the CG processing, countless micro-cracks are newly created on the surface of the lens blank after the processing. Such micro-cracks tend to be extended into a deep portion of glass as a grindstone has the larger abrasive grains in a grain diameter, and extremely deep cracks are difficult to be removed in the subsequent steps (SM processing and polishing processing). In contrast, in the case of using a grindstone in which the grain diameter of the abrasive grains is relatively small, the micro-cracks caused by the grinding processing does not extremely become deeper (for example, remains within 15 μm or less from the surface), and thus the micro-cracks are easy to be removed in the subsequent steps.

Therefore, from the viewpoint of reducing the processing amount and the processing time, it is preferred that the CG processing can be initiated with a grindstone in which the grain diameter of the abrasive grains is relatively small. However, when processing with the grindstone having a small grain diameter, the grindstone is easier to be slipped as the surface to be processed is smoother, and thus a good processing is not likely to be performed. Accordingly, in the case of a lens blank made with a smooth molding surface, it is difficult to initiate the CG processing by use of the grindstone having a small grain diameter, and so it is common that, once after processing the surface with a grindstone having a large grain diameter, the processed surfaces having moderate irregularities is subjected to a processing with the grindstone having a small grain diameter.

In this regard, because the glass lens blanks for polishing according to the present embodiment have the above-described moderate irregularities on the surface to be processed, it is possible to use a grindstone having a relatively small grain diameter. In other words, the surface to be processed has the moderate irregularities, and thereby the CG processing can be initiated while preventing the grindstone from slipping even if the grindstone has a relatively small grain diameter. As a result, it is possible to reduce the influence of micro-cracks in the CG processing, thus allowing the processing amount and processing time to be greatly reduced in the subsequent steps (grinding and polishing processings).

It should be noted that if a surface roughness Rz of the glass lens blank for polishing is too large, there is a tendency to increase the processing amount and processing time for grinding and polishing. For example, when lens blank which has a surface roughness Rz exceeding 50 μm is processed, if a grindstone having a relatively small grain size (for example, #400 to #800) is used in the first grinding processing, clogging of the grindstone is caused and thereby the processing is not proceeded. Therefore, a grindstone having a relatively large grain size (less than #400) is used in the first grinding processing. If the grinding processing is performed with a grindstone having a large grain size, as indicated in a verified result of the relationship between a grain size of a grindstone and micro-cracks, which will be described later, the micro-cracks caused by grinding processing will occur even in a portion inside the lens blank, thereby causing to inhibit the reduction of the processing time.

Accordingly, the surface roughness Rz of the main surfaces 2A, 2B of the glass lens blank for polishing 2 according to the present embodiment is preferably 50 μm or less, more preferably 40 μm or less, and more preferably 30 μm or less.

Further, the surface roughness Rz of the main surfaces 2A, 2B of such glass lens blank for polishing is preferably in a range of 8 μm~50 μm, more preferably 10 μm~50 μm, much more preferably 12 μm~40 μm, still more preferably 20 μm~40 μm, and even still more preferably 20 μm~35 μm.

In the present embodiment, the surface roughness Rz also refers to a maximum height based on JIS standard B0601 in 2001 (which is synonymous with Rmax based on JIS standard B0601 in 1982). This Rz is a difference between the highest point and the lowest point of the irregularities of the surface. A measurement of the surface roughness Rz can be measured by a known measurement device in a manner based on JIS standard.

Further, in the present embodiment, the main surfaces 2A, 2B of the glass lens blanks for polishing 2 have moderate irregularities (for example, of 8 μm~50 μm), and also the defect-containing layer is formed in a thickness of 50 μm or less inwardly from the main surface. The thickness of the defect-containing layer is a value obtained by adding the surface roughness (Rz) to an inherent thickness of the defect-containing layer which exists on the surface of the glass lens blanks for polishing 2.

As a glass material for the glass lens blank 2 of the present embodiment, there are particularly no limitations, but glass as indicated below is used, for example.

An example of a glass preferably used in the present embodiment include (1) fluorophosphatet-based glass containing at least P, O and F as glass components, (2) lanthanum borate-based glass containing a relatively large amount of $B_2O_3$ and $La_2O_3$ in glass components, (3) $SiO_2$—$TiO_2$ based glass containing a relatively large amount of $SiO_2$ and $TiO_2$ in glass components, (4) niobium phosphate optical glass containing $P_2O_5$ as a main component and easily reducible components consisting of Nb, Ti, Bi, and W, and the like.

Next, specific examples of a manufacturing method of a glass lens blank for polishing 2 shown in FIG. 1A will be described with reference to FIGS. 2A to 5.

Figure 2A:
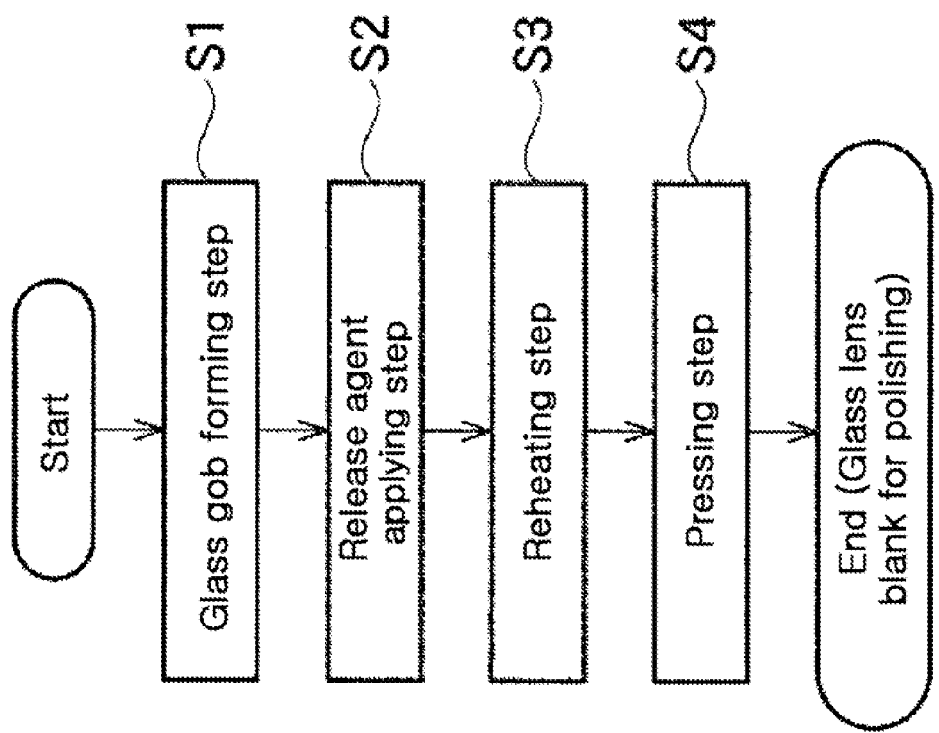
FIG. 2A is a flow chart diagram illustrating the steps for manufacturing the blank shown in FIG. 1A.
Figure 3:
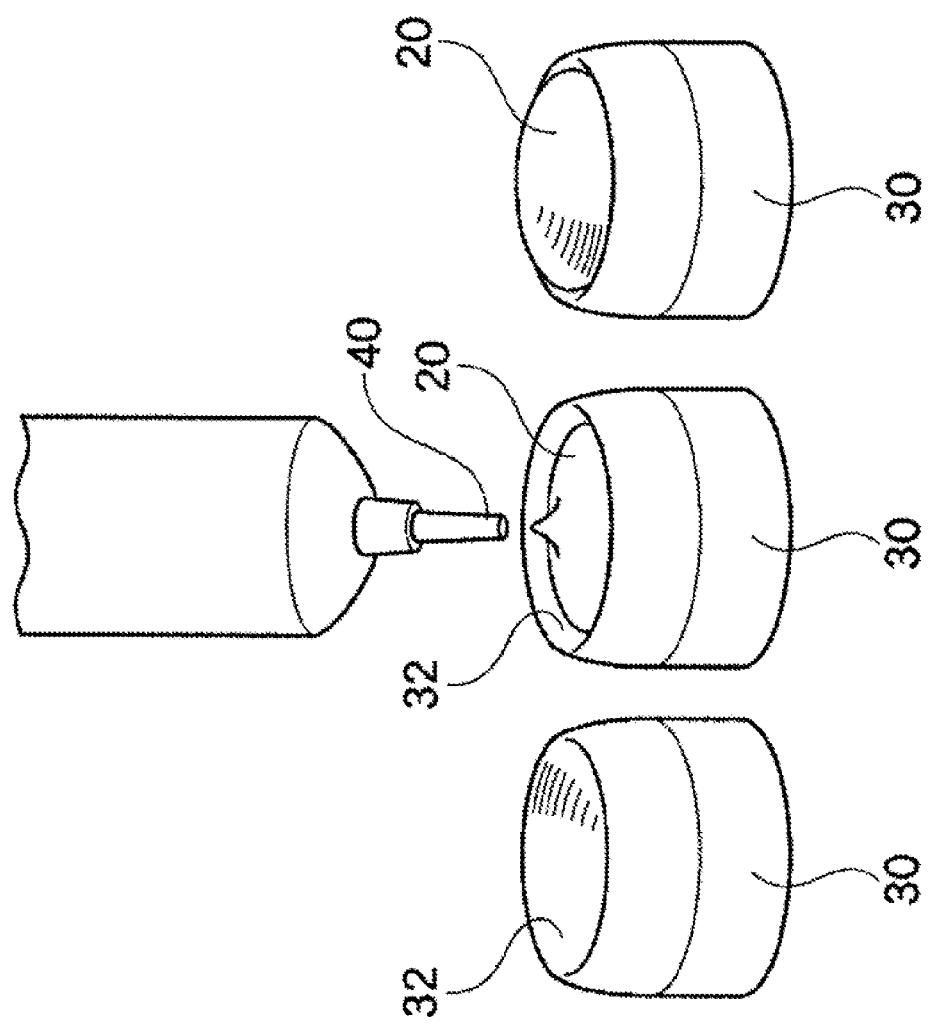
FIG. 3 is a schematic view illustrating an example of the step of forming the glass gob shown in FIG. 2A.

FIG. 2A is a flow chart diagram illustrating the steps for manufacturing the blank shown in FIG. 1A. FIG. 3 is a schematic view illustrating an example of the step for forming the glass gob shown in FIG. 2A. As shown in FIG. 2A, a glass gob is formed at step S1. In order to form a glass gob, as shown in FIG. 3, by dropping a molten glass from a melting glass nozzle 40 with respect to a receiving portion 32 on a concave surface formed on an upper surface of a glass gob receiving saucer 30, the glass gob 20 is formed inside the receiving portion 32.

The receiving saucer 30 has been preheated to a predetermined temperature. The temperature of the receiving saucer 30 is, for example, 250~500° C. Further, a temperature of the nozzle 40 has been controlled to a predetermined temperature. The temperature of the nozzle 40 varies depending on a material of glass, but is for example 700~1200° C., and a viscosity of the glass to be dropped from the nozzle is in a range of 2~30 dPa·s.

Examples of shapes of the glass gob 20 includes, but is not particularly limited to, spherical or its approximate shape, flattened spheroidal shape, biconvex curved surface shape, convexoconcave curved surface shape, and the like.

Also, a surface roughness of the receiving portion 32 as a mold used in a step of forming the glass gobs can have, for example, Rmax of 10~50 μm, but is not particularly limited.

Herein, the term Rmax refers to a maximum height based on JIS standard B0601 in 1982, and the above-described Rz and Rmax are synonymous.

The molten glass in the step of forming the glass gobs has a predetermined viscosity as described above, thus making it possible to produce a number of glass gobs having small weight variations with high productivity. By making the viscosity of the molten glass into the above-described range, a drop-cut can be easily performed. The drop-cut method is that the glass gob receiving saucer 30 receives a forward end of a molten glass flowing out from the nozzle 40 while being lifted up and closed to the nozzle 40, and subsequently, at a predetermined timing, is rapidly dropped at a faster rate than the falling rate of the molten glass, and receives the molten glass at a time when the molten glass having a predetermined weight is separated from the nozzle 40. According to such drop-cut method, it is possible to easily receive the molten glass having a predetermined weight with the receiving saucer 30 without using a cutting blade. In addition, after receiving the molten glass with the receiving saucer 30, it may be cooled as it is, or it may be cooled in a state of being floated or approximately floated.

When the cooled glass gob 20 has a temperature below the glass transition temperature Tg and is moved to a take-out position, it is taken out from the receiving saucer 30. In this way, it is possible to manufacture glass gobs with the productivity of, for example, 15 glass boas or more per minute when a glass gob 20 is 5 g.

In the step of forming the glass gobs, it is preferred that the molten glass has been managed in weight according to the viscosity and cutting conditions thereof. The flow rate of the molten glass can be determined by controlling the viscosity of the molten glass, and the cutting amount can be determined by determining the cutting conditions of the molten glass (cutting speed, cutting timing (interval), cutting method (natural dropping, forced cutting (drop-cut, etc.), and drop rate of drop-cut)). Therefore, it is possible to suppress weight variation of the molten glass to be supplied to the receiving saucer 30. In the present embodiment, the weight variation can be within ±1%, preferably within 0.5%.

Further, in the step of forming the glass gobs, the molten glass to be supplied continuously is, in sequence, heated to a predetermined temperature, and also received and molded with the receiving saucer 30 for molding the glass gob to be supplied continuously so as to form the glass gobs, and thus allowing the glass gobs 20 to be produced with high productivity. In particular, if a plurality of the receiving saucers 30 for molding glass gobs are applied in a row beneath the nozzle so as to form the glass gobs, its effect becomes remarkable.

Furthermore, in the present embodiment, the receiving saucer 30 for molding a glass gob may be controlled to be closer to or separated from the nozzle 40, such that the molten glass can be subjected to a drop-cut. By controlling in such a way, it is possible to easily control a cutting amount. In addition, an outflow rate of the molten glass can be determined by managing a viscosity of the molten glass, and also the cutting amount can be determined by controlling drop-cut conditions, thus allowing the weight variation of the glass gobs to be suppressed. Further, in the present embodiment, since the glass gob 20 is formed without using a cutting blade, the glass gob is free of cut mark (shear mark) remaining on its surface.

It is also possible to suppress the weight variation of the glass gobs by controlling a viscosity of the molten glass, a transfer speed of the receiving saucer 30 and the like. In summary, it is possible to determine the outflow rate of the molten glass flowing out from the nozzle by controlling the viscosity of the molten glass, and it is possible to determine the cutting amount of the molten glass by controlling the transfer speed of the receiving saucer 30.

Additionally, a cutting method of the molten glass is not limited to the drop-cut method as described above, and may employ a natural dropping method or a cutting method using a cutting blade.

In the present embodiment, in consideration of arranging a polishing step of a final lens product as a next step, the glass gobs obtained in the step of forming the glass gob may have, on their surface, defects such as a wrinkle, striae or the like which can be removed in the polishing step.

Figure 4:
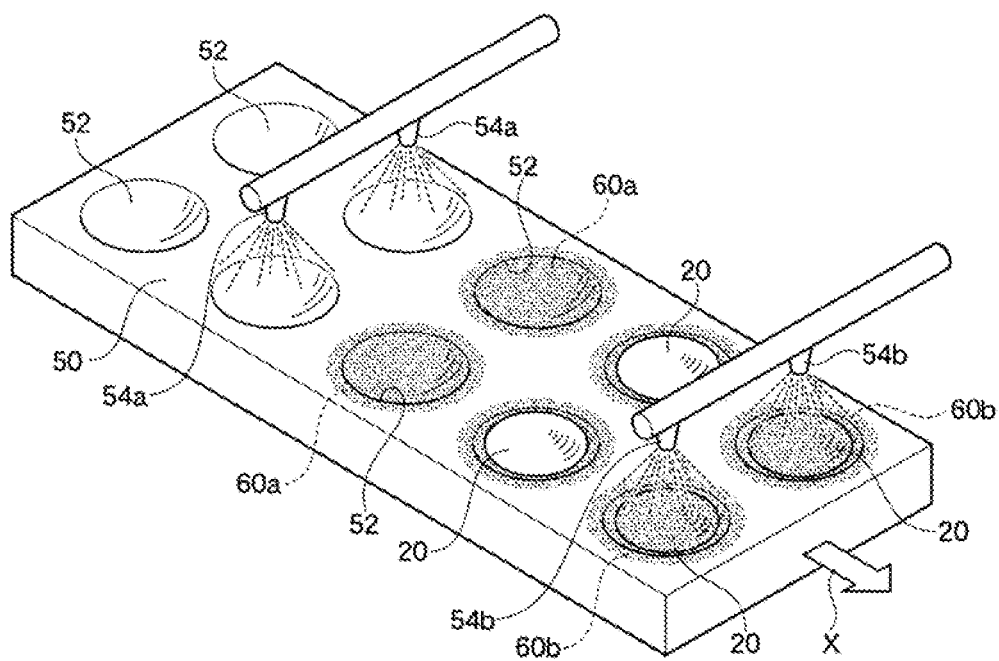
FIG. 4 is a schematic view showing an example of the step of applying the release agent shown in FIG. 2A.

As shown in FIG. 2A, the step S1 of forming the glass gobs is followed by a step S2 where a release agent applying (adhering) step is performed. In this step of applying (adhering) the release agent, in order to prevent the fusion between glass and a saucer for softening to be used to soften the glass gob in a reheating step to be described, the release agent is intervened therebetween. FIG. 4 is a schematic view showing an example of the step of applying the release agent shown in FIG. 2A. In the step of applying (adhering) the release agent, as shown in FIG. 4, a saucer for softening 50 where a plurality of holding recesses 52 are formed is conveyed along a conveying direction X, and at a first position along the conveying direction X, the release agent is sprayed from first release agent nozzles 54a toward empty holding recesses 52 to thereby being applied on all the concave surfaces of the holding recesses. Incidentally, the saucer for softening 50 is comprised of ceramic, metal, brick or the like, which has a heat resistance. Additionally, the release agents 60a, 60b prevent the fusion between the softening saucer 50 and the glass.

The release agents 60a, 60b are preferably applied to protrude out of the concave surfaces of the holding recesses 52. The applied amount (applied density) of the release agent 60a is not particularly limited.

As the release agent 60a, a powdery release agent is used including a boron nitride, alumina, silicon oxide, magnesium oxide, or the like, and the average particle diameter of the release agent is, but not particularly limited to, preferably 1~20 μm. The holding recesses 52 in which the release agent 60a has been applied is conveyed in the conveying direction X, and then the glass gobs 20 are supplied onto the applied release agent 60a between the first release agent nozzles 54a and a second release agent nozzles 54b.

Thereinafter, in a second position at which the second release agent nozzle 54b is disposed, the release agent 60b is sprayed from the nozzle 54b toward all the upper surfaces of the glass gobs 20, and thus applied (adhered). The release agent 60b is preferably the same release agent 60a as described above, but it may be a different kind from or have a different average particle size from the latter. A applied amount of the release agent from the nozzles 54b is preferably same with, but may be different from the applied amount of the release agent from the nozzles 54a. Also, in the case when the release agent 60a is applied (adhered) in the holding recesses 52 of the saucer for softening 50, application adherences of the release agent 60b onto the glass gobs 20 supplied to the holding recesses 52 may be omitted.

As shown in FIG. 2A, after the step S2, a reheating step is performed at step S3. In the reheating step, the saucer for softening 50 on which the glass gobs 20 with the release agents 60a, 60b shown in FIG. 4 applied were placed, is transferred along the conveying direction X into a heating furnace which is not shown. Inside the heating furnace, the glass gobs 20 are reheated.

In the heating furnace, the glass gobs 20 on which the release agent has been applied is heated to a temperature that is equal to or greater than a softening point of the glass material constituting the glass gob 20. For example, they are heated in the heating furnace set to a temperature of 500~1000° C. By this reheating, the glass gob 20 is caused to be softened, and its viscosity preferably becomes $10^4$~$10^6$ dPa·s. Also, the reheating step may be performed under an air atmosphere.

In the present embodiment, when softening the glass gob 20 in a heating furnace, the viscosity of the glass gob 20 is reduced and thereby a height of the glass gob 20 becomes lowered and a diameter thereof becomes extended, but the release agent 60b on the glass gob 20 is inserted around between the glass gob 20 and the holding recess portion 52 and thereby the release agent encloses the glass gob in a small amount as compared with the prior art, and hence a sufficient release effect can be exhibited without performing a roughening processing of the surface of the glass gob.

That is, in the present embodiment, it does not, preferably, have a step of roughening (such as barrel polishing) the surface of the glass gob in the steps from obtaining the glass gob to press-molding. Furthermore, in the present embodiment, it does not, preferably, have a step of grinding or polishing the glass gob in the steps from obtaining the glass gob 20 to press-molding.

Figure 5:
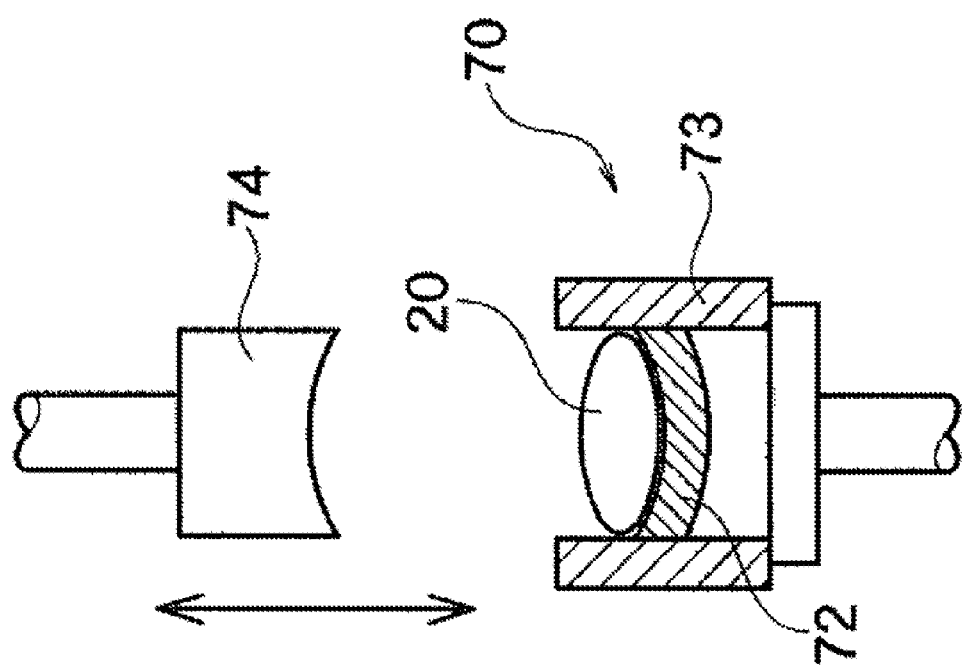
FIG. 5 is a schematic view showing an example of the pressing step shown in FIG. 2A.

As shown in FIG. 2A, after the step S3, a pressing step is performed at step S4. FIG. 5 is a schematic view showing an example of the pressing step shown in FIG. 2A. In the pressing step, the glass gob 20 is press-molded by a mold apparatus 70 shown in FIG. 5. While being softened into a predetermined viscosity ($10^4$ to $10^6$ dPa·s) in the reheating step, the glass gob 20 is transferred onto a lower mold 72 within a barrel mold 73 of the press apparatus 70 shown in FIG. 5. The release agent has been previously applied to the upper mold 74 and lower mold 72.

Further, the upper mold 74 and the lower mold 72 have been preheated to 400~800° C. After that the glass gob 20 is supplied to the lower mold 72, the upper mold 74 is relatively approached with regard to the lower mold 72 and thereby the glass gob 20 is subjected a press processing while being intervened between the upper mold 74 and the lower mold 73. The press-molding can be also performed under an air atmosphere.

Since the press-molding is performed on the glass gob 20 which has been reheated (softened) into the viscosity set by the above-mentioned reheating, a shape close to a final glass product based on the shape of the mold can be produced. By this pressing step, a glass lens blank for polishing 2 shown in FIG. 1A is obtained.

Incidentally, the press load per unit area in the pressing step (hereinafter, simply referred to as "press load") varies depending to a composition or an outer diameter of the glass gob, or a shape of the glass lens blank 2 to be targeted, but is preferably 5~17 MPa (51~173 kgf/cm$^2$). If the press load does not fall within the above range, a shape precision of the glass lens blanks 2 after molding is sometimes deteriorated. In the present embodiment, the shape precision of the glass lens blanks 2 means a precision of a radius of curvature or a center thickness.

In addition, although a single mold apparatus 70 is illustrated in FIG. 5, a plurality of mold apparatus 70 are actually disposed, and also the shape of the molding surface is not limited to the example shown and may correspond to a shape of a bi-convex lens, a bi-concave lens, a plano-convex lens, a plano-concave lens, a convex meniscus lens, or a concave meniscus lens.

Moreover, since the press-molding is performed at a relatively high temperature, it is preferred to apply (adhere) the above-mentioned release agent onto the molding surface of the lower mold 72 and/or the upper mold 74 in order to prevent the fusion between the glass gob 20 and the molds 72, 74.

Further, in the mold to be used when press-molding the glass lens blank for polishing 2 according to the present embodiment, the molding surface of at least one of the lower mold 72 and upper mold 74 has a surface roughness Rz of preferably over 10 μM, more preferably 12 μm or more, and further more preferably 20 μm or more. Also, more preferably, the molding surfaces of both the lower mold 72 and upper mold 74 are desired to have a surface roughness Rz of over 10 μm.

The glass gob 20 which has been softened by the above mold (the mold having moderate irregularities on their molding surfaces) is press-molded, thereby a surface roughness approximating to the surface roughness of the molding surface may be transferred to the surface of the glass lens blank for polishing 2 after press-molding. That is, according to the mold as described above, the glass lens blank for polishing which has moderate irregularities (preferably a surface roughness Rz of 8 μm or more) can be obtained.

Also, in the above a present embodiment, the upper limit of the surface roughness Rz of these molding surfaces is, but not particularly limited to, preferably 50 μm or less, more preferably 40 μm or less, further more preferably 35 μm or less, and much more preferably 30 μm or less. Moreover, the surface roughness Rz of the molding surfaces has a range of preferably over 10 μm~50 μm, more preferably 12 μm~40 μm, further more preferably 20 μm~40 μm, and much more preferably from 20 μm~35 μm.

Further, a mold having moderate irregularities on its molding surface as the above can be prepared by several methods. Examples of the methods may include, in a mold having at least upper and lower molds, a method in which a substrate surface of the upper and/or lower molds corresponding to the molding surface is roughened by a blast processing or reverse etching processing, mechanical machining using cutting tools, or the like; a method in which a film is formed on a substrate surface and the surface of the film is processed to have moderate irregularities; and so on.

Also, in the case of forming a film on the substrate surface of the mold, a applying method, a deposition method, a plating method or the like can be appropriately selected depending on a material constituting the film, and according to these methods, a film having a predetermined film thickness and surface roughness can be formed. Further, as for the film surface, the film may be deposited so as to have moderate irregularities in advance, or otherwise the film may be deposited so as to temporarily have smooth surface, and then processed to have the molding surface with moderate irregularities by a blast processing or reverse etching processing or the like.

Moreover, as such a film, for example, the film comprising an oxide ceramics as a main component (oxide ceramic film) is preferable. The oxide ceramics may include, for example, at least one selected from the group consisting of silica, alumina, zirconia, titania, magnesia, and calcia. Among them, Silica is preferred in terms of durability. Incidentally, only one kind of the oxide ceramics may be used, while two or more kinds of the oxide ceramics may be used only alone or in combination of two or more.

<Optical Lens>

An optical lens according to the present embodiment (hereinafter, sometimes simply referred to as "lens") is formed by grinding and polishing the glass lens blanks for polishing obtained by the present embodiment (hereinafter, sometimes simply referred to as "lens blank").

Now, referring to FIGS. 1B and 2B, the grinding and polishing steps of the lens blank 2 shown in FIG. 1A will be described, but the invention is not in any way limited to the following embodiments and can be performed by adding appropriate modifications within a range to be intended for a purpose of the present invention.

Figure 2B:
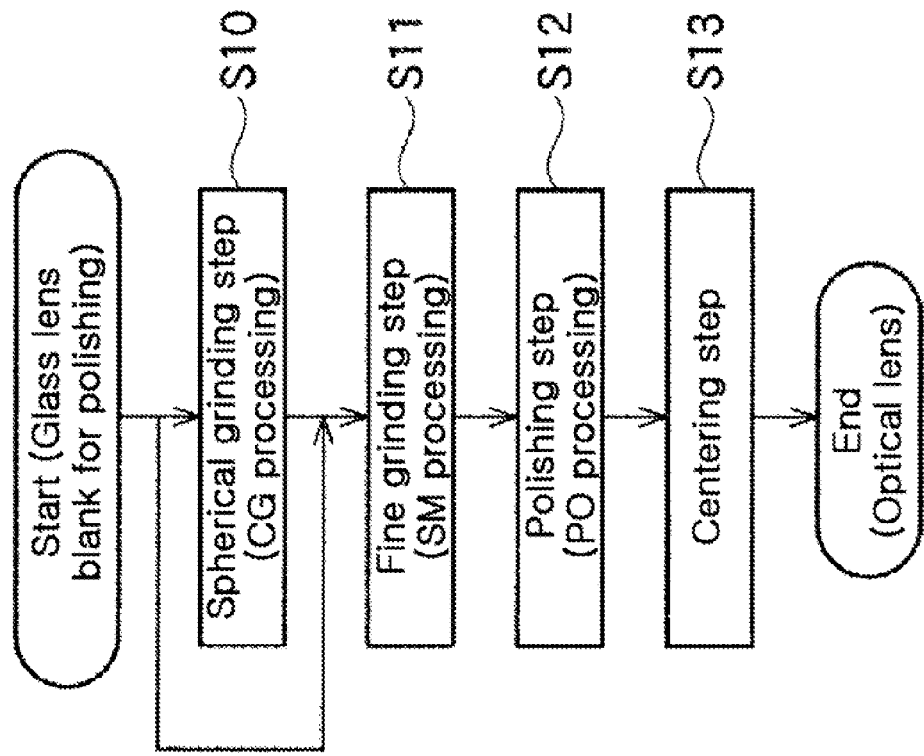
FIG. 2B is a flow chart diagram illustrating the steps for manufacturing an optical lens from the blank shown in FIG. 1A.

First, at a step S10 shown in FIG. 2B, a spherical grinding step (CG processing) of the main surfaces of the lens blank 2 shown in FIG. 1A is performed using a curve generator. Also, a thickness of the CG processing region 10 is not particularly limited, but is preferably 50~200 μm. The processing time required for the CG processing is not particularly limited, but is about 40~90 seconds.

In the CG processing, the CG processing region 10 (CG machining allowance) is ground including the defect-containing layer 2a on the surfaces of the main surfaces of the lens blank 2, as shown in FIG. 1B. The CG processing is carried out by grinding, for example, by use of a grindstone having a portion with the abrasive grains which are made of diamond particulates and have grain diameter of 20~60 μm (#800~#400 expressed as grain size), while supplying a grinding liquid.

By such CG processing, the main surfaces of the lens blank 2 are formed into a shape close to a spherical surface having a predetermined curvature.

In such CG processing, the surface defects formed on the main surfaces of the lens blank are also removed. Typically, in the case that the surface defects formed on the main surface of the lens blank are extended into a deep portion (i.e., the defect-containing layer is thick at the main surfaces), it is needed to scrape the main surface in a relatively large amount at the CG processing step so as to leave no surface defects on the lens after grinding and polishing.

In the lens blank 2 according to the present embodiment, since a thickness of the defect-containing layer 2a formed on the main surface 2A is small to be 50 μm or less (this is also the same at the main surface 2B), the main surface is not required to be scrapped largely (i.e., most of the defect-containing layer is not required to be removed) at the CG processing step. That is, even though greatly reducing the processing amount of the CG processing (moreover, even though excluding the CG processing), the surface defects formed on the main surfaces can be sufficiently removed through the subsequent grinding and polishing steps.

In the lens blank 2 according to the present embodiment, a grindstone having relatively fine grain size can be used as a grindstone for CG processing. Because the grindstone having the fine grain size makes it difficult to process a large amount at a time, it can not be processed when the targeted processing amount is much. However, as for the lens blank 2 according to the present embodiment, since the targeted processing amount in the CG processing can be reduced, the CG processing can be completed even though using the grindstone having the relatively fine grain size.

Also, in the lens blank 2 according to the present embodiment, since it is possible to perform the CG processing by use of the grindstone having the relatively fine grain size, micro-cracks caused by the CG processing can be prevented from be extended into the deep portion of the glass.

Although in the case of using the grindstone having the relatively fine grain size, the amount to be processed at a time is small, but the micro-cracks caused by the processing are not extremely deep (for example, remain within 15 µm or less from the surface) and can be sufficiently removed in later steps.

Next, as shown in FIG. 2B, a smoothing processing by a fine grinding step (SM processing) is performed at the step S11. The SM processing may be one-stage processing or multi-stages processing. In the example shown in FIG. 1B, the SM processing is performed twice by changing the conditions. That is, in the first SM processing, the first SM processing region 11a shown in FIG. 1B (SM machining allowance) is removed by the processing, and in the second SM processing, the second SM processing region 11b is removed by the processing.

Further, in the present embodiment, in these SM processings, the processings are performed using only the resin-bonded grindstone without using metal-bonded grindstone. Thus, in the present embodiment, a depth of the micro-cracks occurring in the surface of the lens blank during the SM processings can be suppressed to be very shallow.

Typically, also in the SM processing in the same manner as the CG processing, countless micro-cracks are newly occurred in the surface of the processed lens blank by contacting the lens blank with a base portion or an abrasive grains portion of the grindstone. Particularly, in the case of using a metal-bonded grindstone, micro-cracks of several tens microns (for example, 30~40 µm) are occurred on the surface of the lens blank by contacting the metal base section of the grindstone with the lens blank upon the SM processing.

In contrast, in the case of using a resin-bonded grindstone, an impact due to contact between the base portion of grindstone and the lens blank is remarkably reduced compared to the metal-bonded grindstone, and therefore the depth of the micro-cracks occurred upon the SM processing can be suppressed to a few microns or less (e.g., 5 µm or less).

In such a way, in the present invention using only the resin-bonded grindstone without using the metal-bonded grindstone, the depth of the micro-cracks caused by the SM processing can be greatly reduced. As such a resin-bonded grindstone, it is preferable to use a grindstone in which the abrasive grains are made of diamond grains and have grain diameter of 8~20 µm (#2500~#1200 expressed as grain size). Also, in the present embodiment, the roughness of the grindstone used in the second SM processing is finer compared with the roughness of the grindstone used in the first SM processing.

Further, in the present invention, since the resin-bonded grindstone having the relatively fine grain size is used during the second SM processing, the depth of the occurring micro-cracks can be further reduced compared to the case of using a grindstone having large grain size. According to the present embodiment, the processing amount of the post-step (polishing processing) can be set as 10 µm or less.

The processing time required for the SM processing to be performed on the lens blank that has undergone the CG processing is not particularly limited, but it is about 30 to 120 seconds in total. The thickness of the SM processing regions 11a, 11b (SM processing amount) is not particularly limited, but preferably 10~50 µm in total, and in the present embodiment, a thickness on the side of the first SM processing region 11a is thicker than a thickness on the side of the second SM processing region 11b, but may be equal to or thinner than the latter.

Incidentally, when performing the SM processing, the processing amount per stage is preferably set to 30 µm or less. By suppressing the SM processing amount per stage in such a way, it is possible to shorten not only SM processing time but also polishing processing time. In addition, it is possible to improve the shape precision of the lens after processing. In the present embodiment, the shape precision of the optical lens means the precision of a radius of curvature or a center thickness.

Next, as shown in FIG. 2B, a polishing processing is performed at the step S12. In the polishing step, the surface is polished with a polishing liquid containing abrasive grains having grain diameter of 5 µm or less, and a polishing region 12 (a polishing allowance) shown in FIG. 1B is polished. The thickness of the polishing region 12 is preferably 3~10 µm, and the processing time thereof is about 2-10 minutes. By this polishing step, optical lens surface 2c (main surface) of the optical lens body 2b is formed.

Finally, although a centering step is performed at Step S13 shown in FIG. 2B, the centering step may be omitted in some cases. The centering step, for example, is a processing that an optical lens body 2b is sandwiched between a pair of the lens holder and subjected to a centering, and while rotating the lens body 2b around its center line, the side peripheral surface of the lens body 2b is ground with a diamond grindstone, etc. into a true circle shape.

Hereinbefore, although the grinding and polishing steps shown in FIG. 2B have been described as an example, the manufacturing process of the optical lens using the lens blank 2 according to the present embodiment is not limited to such steps, and various steps can be carried out.

For example, on the lens blank 2 according to the present embodiment, it is possible not to perform the CG processing of step S10 shown in FIG. 2B. In other words, the processing of the lens blank 2 can be started from the SM processing of step S11 shown in FIG. 2B.

As described above, in the lens blank 2 according to the present embodiment, the thickness of the defect-containing layer 2a that formed on the main surface 2A is small to be 50 µm or less (this is also the same at the main surface 2B), and thus a thickness of the main surface to have to be removed by grinding and polishing processing is originally small. In the lens blank 2 according to the present embodiment, it is not necessary to perform a large amount of processing to remove the defect-containing layer, and the surface defects layer can be sufficiently removed only by performing the processing after the SM processing.

Also, in this case, the metal-bonded grindstone may be used during the SM processing. Incidentally, in the case of using the metal-bonded grindstone, although there is a problem that micro-cracks are extended into the deep portion as described above, it is effective in that it can set a more processing amount compared to the resin-bonded grindstone.

In such a way, it is possible to obtain various optical lenses such as a bi-convex lens, a bi-concave lens, a plano-convex lens, a plano-concave lens, a convex meniscus lens, a concave meniscus lens, or the like. Furthermore, the steps shown in FIG. 2B may be performed in a place being different from a place with that in which the steps shown in FIG. 2A is performed.

In the lens blank 2 to be obtained by the manufacturing method according to the present embodiment, the thickness of the defect-containing layer 2a is 50 µm or less. To this end, as for this lens blank 2, the processing time required for grinding and polishing for obtaining an optical lens can be extremely reduced.

For this reason, in a lens blank 2 of the present embodiment, it is possible to reduce the processing time required for grinding and polishing for obtaining an optical lens by approximately a half or less, as compared with the lens blanks to be obtained by the conventional cut pieces method, for example. Further, in a glass lens blank for polishing according to the present embodiment, it is possible to reduce the processing time required for grinding and polishing for obtaining an optical lens by approximately a half or less, as compared with a lens blanks to be obtained by the method shown in Patent Document 1 (Japanese Patent No. 3806288).

Also, in that as for a lens blank 2 for polishing according to the present embodiment, the thickness of the defect-containing layer 2a is 50 μm or less, grinding waste and polishing waste generated upon grinding processing and polishing processing to obtain an optical lens can be minimized, thereby removing unnecessary use of materials. In addition, since the processing amount is small, the shape precision of the optical lens is also improved.

Further, on an optical function surface of the obtained lens, an antireflection film, a total reflection film, etc. may be coated depending to the intended use.

The present invention is not intended to be limited to the above-described embodiments, and can be modified in a various aspect within the scope of this invention.

For example, in the above present embodiment, when manufacturing the optical lens by the glass lens blank for polishing according to the present invention, the aspect that does not use the metal-bonded grindstone in the SM processing after the CG processing has been preferably exemplified; however it does not prevent the metal-bonded grindstone from being used in the SM processing after the CG processing. That is, the glass lens blank for polishing according to the present embodiment can be preferably used in various manufacturing processes and conditions of the optical lenses that have been performed from the prior art.

EXAMPLE

Hereinafter, the present invention will be described based on the greater detailed examples, but the present invention is not limited to these examples.

Example 1

The fluorophosphate-based molten glass, which was obtained by blending and melting raw materials so as to become a predetermined composition, was continuously flowed down at a constant rate from a flow pipe made of a platinum alloy, and the thus-flowed down glass was received in turn with a mold for molding glass gobs, thereby molding the glass gobs continuously. When a temperature of the glass dropped below the glass transition temperature, the glass gobs were taken out from the mold to manufacture the glass gobs.

Next, a release agent was applied on a receiving saucer for softening 50 of a reheating apparatus to be used in a reheating step.

Then, the obtained glass gobs (diameter of about 25 mm, thickness of about 5 mm, weight of about 15 g) were supplied onto the receiving saucer 50 on which a release agent (boron nitride) had been applied, without performing a preliminary process such as a barrel polishing or the like (that is, while maintaining the surface state of the glass gobs). The glass gobs supplied onto the receiving saucer 50 were charged together with the receiving saucer 50 into a heating furnace which was set to 500~750° C., and were reheated under an air atmosphere. The reheated glass material was softened into a viscosity of about $10^5$ dPa·s.

Subsequently, the glass gobs softened by reheating were press-molded with a mold for press-molding under an air atmosphere, and thereby 100 lens blanks A having both-sided convex shape (diameter of 40 mm, thickness of 3 mm, weight of 15 g) were produced.

Also, with the mold which had been applied with a release agent on its molding surface in advance and had been heated to a temperature of 500° C., the press-molding was performed under a press load of 8~8.5 MPa (81~87 kgf/cm$^2$).

Further, as the mold, one that had been deposited with a coating agent (a ceramic oxide mainly composed of silica) on its molding surface was used. At this time, the molding surface of the mold had the surface roughness Rz of 13~20 μm, and the thus-obtained lens blank A had the surface roughness Rz of 12~30 μm. The variation in the surface roughness Rz of the molding surface also arises as the irregularities of the surface of the molding surface is gradually worn out along with performing the repeated press steps.

Herein, a measurement of each surface roughness Rz was performed using a form tracer CS3000 manufactured by Mitsutoyo Corporation, based on HS standard B0601. Furthermore, each surface roughness is a numerical range including the variation which occurs in the course of producing a predetermined number (100) of lens blanks.

Comparative Example 1

In Comparative Example 1, glass gobs molded by the same method as Example 1 (diameter of about 25 mm, thickness of about 6 mm, weight of about 18 g) were subjected to a barrel polishing, thus making the surfaces thereof roughened so as to facilitate to apply a release agent and to perform a weight adjustment to make the weight of each glass gob equal to the weight of targeted lens blank. Also, during this process, the glass which was sufficiently subjected to an annealing treatment was never damaged. Further, the surface of glass gob which underwent such a preliminary process (barrel polishing) was rough-polished surface.

Herein, the barrel polishing is a method in which the particle-like abrasive agent, compound and water are put into a polishing container together with the glass gob and the polishing is performed by the rotation and up-down movement of the polishing container. A well-known barrel polishing method was performed as the barrel polishing.

Subsequently, the glass gobs subjected to the barrel polishing were applied with the powderary release agent (boron nitride) on the surfaces thereof, and then arranged on a receiving saucer for softening 50 and reheated in a heating furnace. After this reheating step, 100 lens blanks B were produced by the same method as Example 1.

In Comparative Example 1, the molten glass, which was melted in the same manner as in Example 1, was continuously supplied from a flow pipe made of platinum alloy into a mold with its one side opened, and cooled to thereby mold a plate-like glass having a constant width and thickness. In the course of this molding, the plate-like glass was annealed by passing through an annealing furnace having a temperature equal to or slightly higher than the transition temperature Tg of the molten glass.

Then, the anneal-treated glass plate was cut into a constant size (15 mm×15 mm×15 mm, weight of 23 g) to obtain 100 glass pieces called cut pieces. In addition, the cut pieces were subjected to a barrel polishing, thus making its edges round, while their weight adjustment is made so as to make the weight of each cut piece equal to the weight of targeted lens blank. During this process, the glass which was sufficiently subjected to an annealing treatment was never damaged. Also, conditions of the barrel polishing are same as those of the barrel polishing performed on the glass gob as described above.

The surfaces of the cut pieces which underwent such a preliminary process (barrel polishing) were rough-polished surface. Subsequently, this cut pieces were applied with a powderary release agent (boron nitride) on the surfaces thereof, and then arranged on the receiving saucer for softening 50 and reheated in a heating furnace. After this reheating step, 100 lens blanks C were produced by the same method as Example 1.

Then, the obtained lens blanks A~C were subjected to the following evaluations.

(Evaluation 1; Confirmation of the Region in which the Defect-Containing Layer is Present)

According to the following method, it was confirmed whether the defect-containing layer was present in the main surfaces of the lens blanks A~C.

Firstly, the obtained lens blanks A~C were each prepared by 25 pieces, and the surface of the lens blank was polished from the main surface of each lens blank to a depth of 50 μm, 80 μm and 100 μm.

The polishing performed in Evaluation 1 is a polishing for confirming a thickness of the defect-containing layer in the main surface of lens blank. Accordingly, regardless of a final lens shape, the surface of the lens blank is being polished step by step only with polishing processing. Furthermore, the grinding and polishing in Evaluation 2 described below is a grinding and polishing for producing a shape of an optical lens, and is different from the polishing treatment in this evaluation.

A bright spot observation was carried out by irradiating an argon lamp on the lens blanks (each 25 points), on which a surface processing of polishing processing from the main surface of the lens blank to a predetermined depth is finished. The results are shown in FIG. 6.

Figure 6:
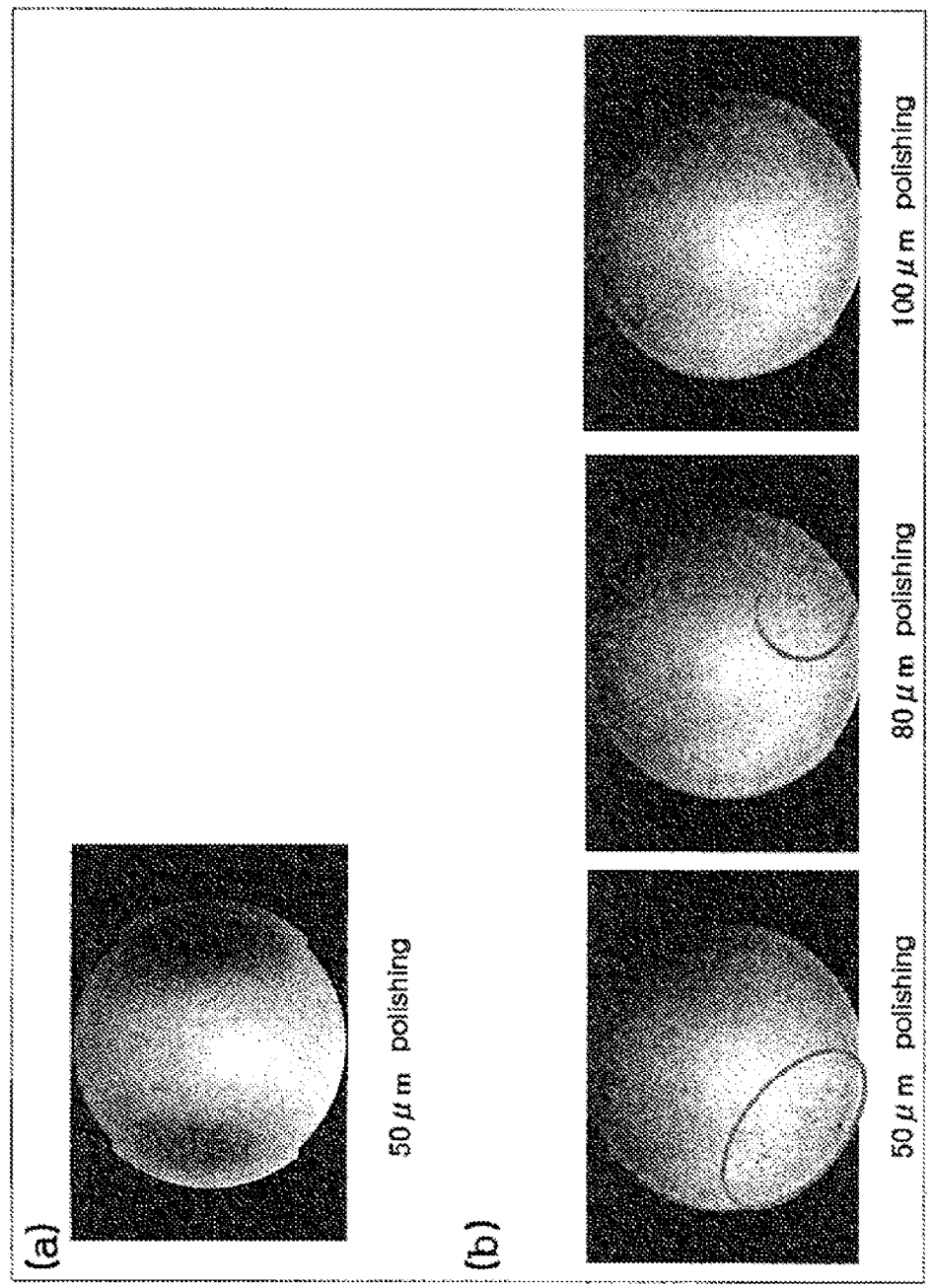
FIG. 6 is a diagram showing the results of observing bright spots according to example and comparative examples.

FIG. 6 is a diagram showing the results of a bright spot observation related to the Example. Typically, the defect-containing layer has some variations in thickness per lens blank. For this reason, if a polishing processing is performed on a plurality of lens blanks from main surfaces to the same depth, in the case of the lens blank having a relatively thick defect-containing layer, the defect-containing layer is not completely removed and thus it sometimes remains on the lens after the polishing processing. Since such defect-containing layer remaining on the lens after the processing scatters light, it causes bright spots. Therefore, what bright spots were not observed in the lens after the processing was regarded as a good product, and a yield rate of the lens blank was calculated. In the present example, the yield rate of 100% was regarded as good. The results are shown in table 1.

TABLE 1

| surface processing amount | yield rate | | |
|---|---|---|---|
| | Example 1 (lens blank A) | Comparative Example 1 (lens blank B) | Comparative Example 2 (lens blank C) |
| 50 μm | 100% | 0% | 0% |
| 80 μm | — | 40% | 28% |
| 100 μm | — | 88% | 72% |

As shown in Table 1, for lens blank A according to the present invention, a yield rate was already 100% when the surface processing amount was the depth of 50 μm from the main surface of the lens blank. For this reason, polishing was not performed on the surface processing amount at depths to 80 μm and 100 μm from the main surface of the lens blank.

As shown in Table 1 and FIG. 6(a), in the lens blank A according to the present invention, the yield rate was already 100% by polishing with the surface processing amount to 50 μm, and there was no sample in which bright spots were observed. That is, for the lens blank A according to the present invention, all the defects-containing layers can be removed from the surface by polishing the main surface of the lens blank at least to the depth of 50 μm.

From such a result, for the lens blank A, it was confirmed that the thickness of the defect-containing layer formed on the main surface of the lens blank was 50 μm or less even though variations per lens blank were also included.

Meanwhile, as shown in FIG. 6(b), in the lens blank B corresponding to the Comparative Example of the present invention, the yield in the polishing of the surface processing amount of 50 μm was 0%, and bright spots in all samples were concentrated and observed in a region inside a circle. That is, for the lens blank B, all the defects-containing layers cannot be removed from the surface with the polishing the main surface of the lens blank to the depth of 50 μm.

From such a result, as for the lens blank B, the thickness of the defect-containing layer formed on the main surface of the lens blank was confirmed to be greater than at least 50 μm even though variations per lens blank were also included.

As for the lens blank B, the yield rate was also confirmed to be improved in case of polishing to a depth of 80 μm from the main surface, furthermore to 100 μm therefrom.

In addition, as for the lens blank C corresponding to Comparative Example of the present invention, it was confirmed that it had the same tendency as the lens blank B.

(Evaluation 2; Confirmation of Machining Allowance Amount)

As for the lens blanks A to C, the confirmation of machining allowance amount was carried out by the following method.

First of all, the obtained lens blanks A~C were each 20 pieces, and ground and polished with the machining allowance amounts being 50 μm, 80 μm, 100 μm, 150 μm, 200 μm, 300 μm and 500 μm at the central portion of each lens blank.

Further, the machining allowance amount in the this evaluation means a cutting allowance amount of the lens blank surface which is lost in the overall grinding and polishing steps upon manufacturing an optical lens from a lens blank. The measuring point of the machining allowance amount was also a central portion of the lens blank (the optical lens after polishing).

Moreover, because the grinding and polishing to be performed in the Evaluation 2 are the grinding and polishing for producing a shape of the optical lens, the conditions thereof are different from those of Evaluation 1 wherein the polishing is performed to follow the surface shape of the lens blank.

On the optical lenses (each 20 pieces) obtained by processing the lens blanks so as to have predetermined machining allowance amount, bright spots were observed using irradiation by an argon lamp. The portions in which defect-containing layers remain, become bright spots by means of light-scattering. Since such bright spots make an optical lens poor, what there are no bright spots is adopted as a good product, and the yield rate was calculated. In the present example, the yield rate of 100% was regarded as good. The results are shown in Table 2.

TABLE 2

| machining allowance amount | yield rate | | |
|---|---|---|---|
| | Example 1 (lens blank A) | Comparative Example 1 (lens blank B) | Comparative Example 2 (lens blank C) |
| 50 μm | 50% | 0% | 0% |
| 80 μm | 85% | 25% | 0% |
| 100 μm | 95% | 45% | 15% |
| 150 μm | 100% | 60% | 30% |
| 200 μm | 100% | 80% | 50% |
| 300 μm | 100% | 95% | 80% |
| 500 μm | 100% | 100% | 95% |

As confirmed in the above Evaluation 1, the lens blank A according to the present invention has the defect-containing layer formed on the main surface, of which a thickness is very thin to be 50 μm or less. For this reason, if an optical lens is manufactured with such lens blank A, the machining allowance amount can be significantly reduced, which is set so as to remove the defect-containing layer during forming a lens shape.

As shown in Table 2, in the case of manufacturing an optical lens with the lens blank A according to the present invention, even if the machining allowance amount at the central portion of the lens blank is set to 150 μm, the defect-containing layer on the entire lens surface can be sufficiently removed, and the yield rate is confirmed to become 100%.

Meanwhile, the lens blank B and the lens blank C corresponding to Comparative Examples of the present invention, a thickness of the defect-containing layer formed on the main surface is greater than 50 μm (see Evaluation 1). For this reason, if an optical lens is manufactured with such lens blanks B and C, the machining allowance amount is needed to be set large in order to completely remove the defect-containing layer.

That is, as shown in Table 2, in the case of manufacturing an optical lens with the lens blank B and the lens blank C corresponding to Comparative Examples of the present invention, it was confirmed that the machining allowance amount was needed to be set as 50% μm or more, since the defect-containing layer on the entire lens surface was completely removed after taking a variation of each lens blank into consideration.

Furthermore, the lens blank A according to the present invention has a yield rate of 50% in the case of the machining allowance amount of 50 μm. This means that even if the lens blank A was processed by the machining allowance amount of 50 μm, the defects containing layer could not be completely removed in 50% of the samples. However, with this respect, it is not possible to evaluate that the thickness of the defect-containing layer is greater than 50 μm, and this does not contradict the Evaluation 1.

That is, the ranges to be evaluated are different between the processing amount in the Evaluation 1 and the machining allowance amount in the Evaluation 2. In other words, in the Evaluation 1, the thickness itself of the defect-containing layer on the main surface of the lens blank is evaluated by the processing amount, whereas in the Evaluation 2, the machining allowance amount when manufacturing an optical lens is evaluated.

Therefore, the machining allowance amount of Evaluation 2 is not simply determined only by the thickness of the defect-containing layer formed on the main surface of the lens blank, but the influence of other factors is also needed to be considered such as waviness of the lens blank surface or the like.

(Evaluation 3; Confirmation of the Grinding and Polishing Conditions)

As for the lens blanks A to C, the grinding and polishing conditions of the lens blank until producing an optical lens were confirmed. Specifically, when performing a CG processing (spherical grinding), a SM processing (smoothing processing; a plurality of stages, as necessary) and a PO processing (polishing processing) as the grinding and polishing until producing an optical lens, the optimal processing conditions of each process were confirmed. The results are shown in Table 3.

TABLE 3

| | No | | | | | | | | |
|---|---|---|---|---|---|---|---|---|---|
| | Example 1 (lens blank A) | | | Comparative Example 1 (lens blank B) | | | Comparative Example 2 (lens blank C) | | |
| | glass material | | | | | | | | |
| | fluorophosphate-based | | | fluorophosphate-based | | | fluorophosphate-based | | |
| | tool | processing amount [μm] | processing time [sec] | tool | processing amount [μm] | processing time [sec] | tool | processing amount [μm] | processing time [sec] |
| CG processing | grindstone #600 | 100-200 | 45-90 | grindstone #230 | 500-600 | 30-50 | grindstone #230 | 500-800 | 30-60 |
| SM1 processing | resin-bonded grindstone #2500 | 15-30 | 30-45 | metal-bonded grindstone #1200 | 50-90 | 40-60 | metal-bonded grindstone #1200 | 50-90 | 40-60 |
| SM2 processing | — | — | — | resin-bonded grindstone #2000 | 10-20 | 60-120 | resin-bonded grindstone #1500 | 10-20 | 80-150 |
| PO processing | free abrasive grain containing CeO$_2$ | 3-7 | 420 or less | free abrasive grain containing CeO$_2$ | 10-20 | 600-1200 | free abrasive grain containing CeO$_2$ | 10-20 | 600-1200 |
| total of the above steps | | 120-240 | 550 or less | | 570-730 | 730-1430 | | 570-830 | 730-1440 |

Tools used in each process, and a processing amount and processing time of each process are shown as Table 3.

As the lens blank A according to the present invention has the defect-containing layer formed on the main surface of which a thickness is thin to be 50 μm or less, in the case of manufacturing an optical lens using it, the machining allowance amount required to remove the defect-containing layer can be greatly reduced (see Evaluation 2).

Therefore, since it is possible to reduce the grinding amount of the lens blank when using the lens blank A, even though performing CG machining with grindstone of #600 having a relatively fine mesh (average grain size of about 30 μm), there is nothing to lead to significant prolongation of grinding time. Moreover, by performing grinding using grindstone with a fine mesh in such a way, the micro-cracks occurring in the lens surface due to grinding can be effectively prevented from progressing in the depth direction thereof (spreading of processing damage layer due to grinding), and thus the lens surface after CG processing can be relatively well maintained.

As a result, since the processing damage layer due to grinding in the lens surface after CG processing is small when using the lens blank A according to the present invention, even if #2500 resin-made abrasive tool (resin-bonded grindstone for example, manufactured by Alpha Diamond Industrial Co., Ltd.) is used in SM processing to be continuously performed, it is possible to sufficiently remove the processing damage layer due to grinding. As a result, it is possible to proceed to the polishing processing (PO processing) as a final step without performing an additional SM processing. Furthermore, because of using resin-bonded grindstone of #2500 having a fine mesh (average grain size of about 8 μm), the surface state after SM processing is kept good, and it becomes possible to significantly reduce the processing time for PO processing.

Meanwhile, the lens blanks B and C according to Comparative Example of the present invention have the defect-containing layer formed on the main surface of which a thickness is thick to be greater than 50 μm, and in the case of manufacturing an optical lens using these, the large machining allowance amount required to completely remove the defect-containing layer and increase the yield rate is needed to be set (see Evaluation 2).

Therefore, in the lens blanks B and C needed to be set to have the large machining allowance amount, it is difficult to perform the CG processing with grindstone of #600 having a fine mesh, because of causing significant prolongation of grinding time, together with making it impossible to grind due to clogging. For this reason, in order to increase the grinding amount per processing time, it is necessary to start the CG processing with a grindstone having a coarse mesh such as #230 (average grain size of about 70 μm). However, because of using the grindstone having a coarse mesh, the micro-cracks occurring in the lens surface due to grinding cannot be prevented from progressing in the depth direction thereof, and thus a defect layer due to grinding tends to increase.

In order to remove the processing damage layer due to such grinding in later processes, several times of SM processings are required, as it is necessary to increase the grinding amount even in the subsequent SM processing. Furthermore, in the fact of resulting in significant prolongation of processing time, it is difficult to start from SM processing with the resin-bonded grindstone having a fine mesh (#2500), as used in lens blank A.

Therefore, a grindstone with a sharply fine grain size cannot be used even in the SM processing, and so the state of lens surface after SM processing is poor, compared to the case of using a lens blank A according to the present invention. For this reason, even in the polishing processing as a final step, it is necessary to set the processing amount larger and the processing time longer than the case of using the lens blank A according to the present invention.

As explained above, in the lens blank A according to the present invention and lens blanks B and C corresponding to the Comparative Examples of the present invention, it was confirmed that a difference therebetween occurs in terms of a desired tool, processing amount and processing time in the step of forming the lens. In particular, as shown in Table 3, when using a lens blank A according to the present invention, the processing amount and processing time have been confirmed to be greatly reduced through the entire grinding and polishing steps, as compared with the case of using lens blanks B and C.

(Comprehensive Evaluation)

As described above, the lens blank A according to the present invention has the defect-containing layer formed on the main surface, of which a thickness is 50 μm or less. In the case of manufacturing an optical glass by using such lens blank A, even if the machining allowance amount is greatly reduced, it is possible to achieve a high yield rate. Furthermore, since the machining allowance amount can be greatly reduced, it is possible to use a grindstone having a relatively fine mesh (#600) in the CG processing. As a result, the subsequent SM processing can be sufficiently carried out with a resin-bonded grindstone having a relatively fine mesh (#600), and thereby the processing amount and processing time for the final step may be reduced. Particularly, in the case of using a lens blank A according to the present invention, in that the processing amount and processing time can be greatly reduced through the entire grinding and polishing steps, production costs can be saved.

Example 2

In Example 2, lens blank D was prepared in the same manner as in Example 1, except for using lanthanum borate-based glass instead of the fluorophosphate-based glass as a glass material for lens. Incidentally, lanthanum borate-based glass is a hard material as a glassy material, as compared to the fluorophosphate glass.

Comparative Example 3

In Comparative Example 3, lens blank E was prepared in the same manner as in Comparative Example 1, except for using lanthanum borate-based glass instead of the fluorophosphate-based glass as a glass material for lens. Incidentally, lanthanum borate-based glass is a hard material as a glassy material, as compared to the fluorophosphate glass.

Comparative Example 4

In Comparative Example 4, lens blank F was prepared in the same manner as in Comparative Example 2, except for using lanthanum borate-based glass instead of the fluorophosphate-based glass as a glass material for lens. Incidentally, lanthanum borate-based glass is a hard material as a glassy material, as compared to the fluorophosphate glass.

As for the obtained lens blanks D to F, the Evaluations 1 to 3 were carried out in the same manner as in Example 1. In particular, the results of the Evaluation 2 (confirmation of the machining allowance amount) are shown in Table 4.

Note that in each evaluation, the yield rates were determined using 20 pieces of lens blanks.

TABLE 4

| surface processing amount | yield rate | | |
|---|---|---|---|
| | Example 2 (lens blank D) | Comparative Example 3 (lens blank E) | Comparative Example 4 (lens blank F) |
| 50 μm | 60% | 0% | 0% |
| 80 μm | 90% | 30% | 0% |
| 100 μm | 95% | 55% | 25% |
| 150 μm | 100% | 65% | 40% |
| 200 μm | 100% | 85% | 55% |
| 300 μm | 100% | 95% | 85% |
| 500 μm | 100% | 100% | 95% |

The Evaluations 1 to 3 were performed on the obtained lens blanks D to F, and consequently the same results were confirmed to be obtained, regardless of the difference in the glass composition (and furthermore the properties such as glass hardness or the like).

That is, in the lens blank D according to the present invention, the defect-containing layer formed on main surface thereof has a thickness of 50 μm or less, and in the case of manufacturing the optical glass by using such lens blank D, high yield rate can be achieved even though greatly reducing a machining allowance amount.

Furthermore, since the machining allowance amount can be greatly reduced, it is possible to use a grindstone having a relatively fine mesh (for example, #400~#800) in the CG processing. As a result, the subsequent SM processing can be sufficiently carried out with a resin-bonded grindstone having a fine mesh (for example, #1500~#2500), and thereby the processing amount and processing time for the final step may be reduced. Particularly, in the case of using the lens blank D according to the present invention, in that the processing amount and processing time can be greatly reduced through the entire grinding and polishing steps, production costs can be saved.

Examples 3 to 5

In Examples 3 to 5, a respective lens blank was prepared and conducted on Evaluation 3 (confirmation of the grinding and polishing conditions), except for changing a glass material constituting the lens blank and the grinding and polishing conditions of the lens blank until producing an optical lens as shown in Table 5.

The molding surface of the mold used in Example 3 also had the surface roughness Rz of 20~30 μm, and the obtained lens blank had the surface roughness Rz of 17~38 μm. Further, the molding surfaces of the mold used in Examples 4 and 5 had the surface roughness Rz of 15~25 μm, respectively, and the obtained lens blanks had the surface roughness Rz of 11~30 μm, respectively. A measurement of the surface roughness Rz was carried out in the same manner as described above.

Moreover, the press load of the press step in manufacturing the lens blank of Example 3 was 8.5~9 MPa (87~92 Kgf/cm$^2$), and the press load in Examples 4 and 5 was 15~16 MPa (152~163 Kgf/cm$^2$).

TABLE 5

| | Example 3 | | | Example 4 | | | Example 5 | | |
|---|---|---|---|---|---|---|---|---|---|
| | glass material | | | | | | | | |
| | fluorophosphate-based | | | lanthanum borate-based | | | lanthanum borate-based | | |
| | tool | processing amount [μm] | processing time [sec] | tool | processing amount [μm] | processing time [sec] | tool | processing amount [μm] | processing time [sec] |
| CG processing | grindstone #600 | 120-200 | 45-70 | grindstone #600 | 100-200 | 50-90 | grindstone #600 | 130-180 | 50-70 |
| SM1 processing | resin-bonded grindstone #1500 | 20-30 | 30-45 | resin-bonded grindstone #2000 | 20-30 | 60-70 | resin-bonded grindstone #1500 | 15-30 | 40-60 |
| SM2 processing | resin-bonded grindstone #2500 | 10-20 | 30-40 | — | — | — | resin-bonded grindstone #2500 | 10-15 | 50-70 |
| PO processing | free abrasive grain containing CeO$_2$ | 4-7 | 240-420 | free abrasive grain containing CeO$_2$ | 5-10 | 300-600 | free abrasive grain containing CeO$_2$ | 4-7 | 240-420 |
| total of the above steps | | 150-250 | 360-570 | | 130-240 | 410-730 | | 160-230 | 380-620 |

According to the lens blank according to the present invention, regardless of the glass material, and also even though variously changing the conditions of grinding the lens blank until producing an optical lens (e.g., changing the number of stages of the SM processing), the entire processing amount and processing time were confirmed to be greatly reduced, as compared to Comparative Examples 1 and 2 described heretofore. In particular, as for all, the processing amount in the PO processing was confirmed to be greatly reduced.

Examples 6 to 7

In Examples 6 to 7, a respective lens blank was prepared and conducted on Evaluation 3 (confirmation of the grinding and polishing conditions), except for changing a glass material constituting the lens blank and the grinding and polishing conditions of the lens blank until producing an optical lens as shown in Table 6. Specifically, in Examples 6 and 7, an optical lens was produced by performing polishing and smoothing processing, without performing CG processing. The results are shown in Table 6.

In addition, the molding surface of the mold used in Example 6 had the surface roughness Rz of 12~25 µm, and the obtained lens blank had the surface roughness Rz of 8~27 µm. The molding surface of the mold used in Example 7 had also the surface roughness Rz of 15~25 µm, and the obtained lens blank had the surface roughness Rz of 13~25 µm. A measurement of the surface roughness Rz was carried out in the same manner as described above.

Moreover, the press load of the press step in manufacturing the lens blank of Example 6 was 8~8.5 MPa (81~87 Kgf/cm$^2$), and the press load in Example 7 was 14~15 MPa (142~153 Kgf/cm$^2$).

TABLE 6

| | Example 6 | | | Example 7 | | |
|---|---|---|---|---|---|---|
| | glass material | | | | | |
| | fluorophosphate-based | | | lanthanum borate-based | | |
| | tool | processing amount [µm] | processing time [sec] | tool | processing amount [µm] | processing time [sec] |
| CG processing | — | — | — | — | — | — |
| SM1 processing | metal-bonded grindstone #800 | 90-110 | 50-70 | metal-bonded grindstone #800 | 80-110 | 50-75 |
| SM2 processing | resin-bonded grindstone #1500 | 45-60 | 50-70 | resin-bonded grindstone #1500 | 40-50 | 45-60 |
| SM3 processing | resin-bonded grindstone #2500 | 7-12 | 40-70 | resin-bonded grindstone #2500 | 7-10 | 40-60 |
| PO processing | free abrasive grain containing CeO$_2$ | 3-8 | 180-480 | free abrasive grain containing CeO$_2$ | 5-10 | 300-480 |
| total of the above steps | | 145-190 | 460-690 | | 140-180 | 450-660 |

In Examples 6 and 7, CG processing was omitted, a metal-bonded grindstone (#800) was used in SM1 processing, and resin-bonded grindstones (#1500, #2500) were used in the subsequent SM2 processing and SM3 processing.

According to the lens blank according to the present invention, since a thickness of the defect-containing layer on the main surface (in particular, the central portion) is thin, i.e., 50 µm or less, surface defects can be sufficiently removed only by processes after SM processing, even though omitting CG processing. Therefore, as shown in Table 6, according to the lens blank according to the present invention, the overall processing amount and processing time were confirmed to be greatly reduced, as compared to Comparative Examples 1 and 2.

(For a Relationship Between a Grain Size of a Grindstone and Micro-Cracks)

In general, in order to shorten a processing time, a processing efficiency may be sometimes improved by coarsening the grain size of the grindstone used in the CG processing and SM processing. However, if using a grindstone of which grain size is coarse, there is a tendency that micro-cracks occurred by processing become larger. So, a relationship between the grindstone for the CG processing and the micro-cracks that occur on the lens surface due to grinding, was verified for every glass composition.

Specifically, for the lens blanks A and D having different glass compositions, the CG processing was performed with the metal-bonded grindstone having a diamond grain size varied as shown in Table 7, and a direct grinding was performed on the processed surface which have been ground with each grindstone, such that the amount of grinding (µm) until having no surface defects was confirmed. The results are shown in Table 7.

TABLE 7

| | grinding amount to be required | |
|---|---|---|
| metal-bonded grindstone | lens blank A fluorophosphate-based glass | lens blank D lanthanum borate-based glass |
| #230 | 90 µm | 65 µm |
| #270 | 70 µm | 40 µm |
| #400 | 30 µm | 25 µm |
| #600 | 20 µm | 20 µm |

As shown in Table 7, a processing damage layer (surface defects) was confirmed to be significantly reduced by micronizing the diamond grain size of the grindstone for the CG processing. In addition, with the larger diamond grain size of the grindstone for the CG processing, the processing damage layer was confirmed to have extend more deeply from the lens surface.

Also, the processing damage layer caused by the CG processing is needed to be removed in the subsequent SM processing. In a SM1 processing, it can be ground by 70 μm per processing through using a metal-bond grindstone of #1200. In a SM2 processing, it can be ground in a unit of 10 μm through using a resin-bond grindstone of #1500. Thus, for example, in the case of performing a CG processing with a grindstone of #230 on lens blank A, the grinding amount required to remove the processing damage layer is 90 μm. In this case, by performing the SM1 processing once with a metal-bond grindstone of #1200 and the SM2 processing twice with a resin-bonded grindstone of #1500 as subsequent processes, the processing damage layer can be removed in the case of performing the CG processing with a grindstone of #230.

Next, a relationship between the grindstone for the SM processing and the micro-cracks that occur on the lens surface due to grinding, was verified for each glass composition. Specifically, for the lens blanks A and D having different glass compositions, a SM processing was performed with the resin-bonded grindstone having a surface roughness varied as shown in Table 8, and a direct grinding was performed on the processing surface which have been ground by each grindstone, such that the amount of grinding (μm) until having no surface defects was confirmed. The results are shown in Table 8.

layer induced due to the surface roughness of the resin-bonded grindstone was removed in the polishing step (PO step).

Examples 8 to 10

In Examples 8 to 10, a respective lens blank was prepared and conducted on Evaluation 3 (confirmation of the grinding and polishing conditions), except for changing a glass material constituting the lens blank and the grinding and polishing conditions of the lens blank until producing an optical lens as shown in Table 9.

The molding surface of the mold used in Example 8 had also the surface roughness Rz of 17~27 μm, and the obtained lens blank had the surface roughness Rz of 20~40 μm. The molding surface of the mold used in Examples 9 and 10 had also the surface roughness Rz of 16~28 μm, and the obtained lens blanks had the surface roughness Rz of 14~37 μm. A measurement of the surface roughness Rz was carried out in the same manner as described above.

Moreover, the press load of the press step in manufacturing the lens blank of Example 8 was 9.5~10 MPa (96~102 Kgf/cm$^2$), and the press load in Examples 9 and 10 was 13~14.5 MPa (132~148 Kgf/cm$^2$).

TABLE 9

| | | | No | | | | | |
|---|---|---|---|---|---|---|---|---|
| | Example 8 | | | Example 9 | | | Example 10 | |
| | | | glass material | | | | | |
| | fluorophosphate-based | | | lanthanum borate-based | | | lanthanum borate-based | |
| | tool | processing amount [μm] | processing time [sec] | tool | processing amount [μm] | processing time [sec] | tool | processing amount [μm] | processing time [sec] |
| CG processing | grindstone #400 | 150-200 | 40-60 | grindstone #500 | 100-150 | 50-70 | grindstone #800 | 80-140 | 40-80 |
| SM1 processing | resin-bonded grindstone #1500 | 20-30 | 50-60 | resin-bonded grindstone #2000 | 20-30 | 60-70 | resin-bonded grindstone #1500 | 15-25 | 45-60 |
| SM2 processing | resin-bonded grindstone #2500 | 5-10 | 45-60 | — | — | — | resin-bonded grindstone #2500 | 7-12 | 50-60 |
| PO processing | free abrasive grain containing CeO$_2$ | 3-7 | 180-420 | free abrasive grain containing CeO$_2$ | 4-8 | 240-480 | free abrasive grain containing CeO$_2$ | 3-8 | 180-480 |
| total of the above steps | | 200-250 | 330-600 | | 130-190 | 350-620 | | 125-185 | 320-680 |

TABLE 8

| resin-bonded grindstone | grinding amount to be required |
|---|---|
| #1500 | 7~9 μm |
| #2000 | 5~7 μm |
| #2500 | 2~4 μm |

As shown in Table 8, the formation amount of the processing damage layer due to using the resin-bond grindstone was proportional to the surface roughness of grindstone thereof, but was not greatly influenced by the difference in the glass composition. For this reason, regardless of the composition, unless the processing damage layer was thick in the previous steps (CG processing, etc.), it was confirmed to be enough that only the processing damage In Examples 8 to 10, by using the lens blanks according to the present invention even when having performed a CG processing using a grindstone of which a grain size is expressed as #400 to #800, the processing amount and the processing time could be greatly reduced throughout the entire grinding and polishing steps.

In Example 8, the processing amount per stage in SM processings was set to be 30 μm or less. In Example 8, because a curvature of the lens blank after processing had tended to deviate from a predetermined value at an initial stage of the SM processing (SM1), a shape correction of a resin-bonded grindstone (#1500) was carried out once. Since a curvature of the lens blank was stabilized in the subsequent SM processing, a correction of a grindstone was unnecessary. Moreover, since the lens blank of which shape precision was stabilized by SM processing was obtained, a correction of the polishing saucer was unnecessary in the subsequent PO processing.

In Example 8, the total processing amounts of the CG processing, SM processing, and PO processing were at most 250 μm, and could be greatly reduced compared with Comparative Examples 1 and 2 indicated in Table 3. Furthermore, the total processing times of all the CG processing, SM processing, and PO processing, also including the time required for grindstone correction, were at most 600 seconds, and an optical lens could be processed in a short time as compared with Comparative Examples 1 and 2 indicated in Table 3. Also, in Comparative Examples 1 and 2, in the case of each processing 100 optical lenses, the shape correction of the resin-bonded grindstone was carried out 5 times or more in both of the SM processings 1 and 2, and additionally the correction of the polishing saucer was carried out 5 times or more in each PO processing, in order to bring the shape precision into the desired range.

Furthermore, also in Examples 9 and 10, the shape correction of the resin-bonded grindstone used in the SM processing (SM1) was carried out once, whereas the correction of the resin-bonded grindstone and polishing saucer were unnecessary. And, the total processing amount (at most 190 μm) was small as compared to Comparative Examples 1 and 2, and so an optical lens could be processed in a short time (at most 680 seconds).

As can be seen from the results of Examples 8 to 10, it has been confirmed with the use of a lens blank according to the present invention that the processing amount per stage in the SM processing was suppressed to a predetermined amount or less, and thus the load on the grindstone in the SM processing was alleviated, and the shape change of the grindstone itself was suppressed. Therefore, even the grindstone is continuously used over hundreds of times, the correction of the grindstone can be suppressed to the required minimum, the overall processing time can be effectively reduced. In addition, it is possible to increase the shape precision of the optical lens. Further, in the same manner as in Examples 1 to 5, the processing amount of the SM processing was 30 μm or less, and a number of the correction of the grindstone in SM processing was limited to a minimum, and thus it was confirmed that the overall processing times could be greatly reduced.

Finally, the present embodiment will be outlined by use of drawings or the like.

In the glass lens blanks for polishing 2 of the present embodiment of which at least a main surface is a press-molded surface, a thickness of the defect-containing layer to be formed on the main surface is 50 μm or less, as shown in FIGS. 1A and 1B.

Preferably, the glass lens blanks for polishing 2 of the present embodiment have the main surfaces 2A, 2B of which the surface roughness Rz is no less than 8 μm.

Preferably, the glass lens blanks for polishing 2 of the present embodiment, as shown in FIGS. 3 and 5, are obtained by the method comprising the steps of: receiving and molding a molten glass 20 to be supplied from a nozzle 40 with a mold 30 for molding a glass gob to obtain a glass gob; and reheating the glass gob 20 and press-molding it with a mold 70 for molding a lens blank under an air atmosphere.

More preferably, the glass lens blanks for polishing 2 of the present embodiment, as shown in FIG. 2A, do not need a step of roughening a surface of the glass gob in the steps S1 to S4 after obtaining the glass gob until press-molding.

Further preferably, the glass lens blanks for polishing 2 of the present embodiment, as shown in FIG. 2A, do not need a step of grinding or polishing the glass gob in the steps S1 to S4 after obtaining the glass gob until press-molding.

A method of manufacturing a glass lens blank for polishing 2 according to another aspect of the present invention, as shown in FIGS. 2A, 3, 4, and 5 comprises a step S1 of receiving and molding a molten glass to be supplied from a nozzle with the mold 30 for molding a glass gob to obtain a glass gob, a release agent applying step S2 of coating a release agent on the glass gob 20 while maintaining the surface state of the glass gob 20, a reheating step S3 of reheating the glass gob 20 applied with the release agent in the release agent applying step S2 into a viscosity from $10^4$ to $10^6$ dPa·s under an air atmosphere, and a press step S4 of press-molding the glass gob 20 reheated in the reheating step S3 with the mold 70 for press-molding under an air atmosphere, thereby obtaining a glass-molded article 2 having a press-molded surface on at least the main surface thereof, wherein a thickness of a defect-containing layer 2a formed on the main surface of the glass-molded article 2 obtained by the step S4 of press-molding is 50 μm or less.

Preferably, a step of adhering a release agent is further comprised, wherein the step is for adhering the release agent to at least any one of a surface of the glass gob before the reheating step, and a holding recess for placing the glass gob in the reheating step.

Preferably, as shown in FIG. 4, in the release agent applying step S2, a release agent is applied to the holding recess portion 52 in which a glass gob 20 will be placed, and then the glass gob 20 is placed in the holding recess portion 52, and further a release agent is applied to the glass gob 20.

Preferably, a pressing load of the pressing step is 5~17 MPa in the manufacturing method of the glass lens blank for polishing 2.

Moreover, in another aspect of the invention, a method of manufacturing an optical lens from the glass lens blanks for polishing 2 is carried out with a spherical grinding processing (CG processing), a smoothing processing (SM processing) and polishing processing (PO processing), wherein in the smoothing processing, the processing is performed using a grindstone bonded with resin (resin-bonded grindstone) without using a metal-bonded grindstone.

Preferably, the spherical grinding step is performed using a grinding tool of #400 to #800 expressed as a grain size and the grinding amount thereof is 200 μm or less.

More preferably, as for the glass lens blank for polishing underwent the spherical grinding processing S10, the smoothing processing S11 is performed in one stage or a plurality of stages, and the processing amount of each stage of the smoothing processing S11 is 30 μm or less.

Further, in another aspect of the invention, a method of manufacturing an optical lens from the glass lens blanks for polishing 2 is carried out without a spherical grinding processing S10 and with a smoothing processing S11 and polishing processing S12, wherein a resin-bonded grindstone and a metal-bonded grindstone are used in the smoothing processing S11.

Furthermore, the method of manufacturing an optical element in another aspect is preferably a method of manufacturing an optical lens comprising a step of grinding the glass lens blank for polishing and a step of polishing the glass lens blank for polishing having undergone a grinding step, wherein the grinding step includes a spherical grinding step of spherically processing the glass lens blank for polishing, and a step of performing a smoothing processing with one stage or a plurality of stages on the glass lens blank for polishing having undergone the spherical grinding step, wherein the lens spherical grinding step is performed using a grinding tool of #400 to #800 expressed as a grain size, the grinding amount thereof is 200 µm or less, and the processing amount per stage in the smoothing processing is 30 µm or less.

The embodiments disclosed herein are in all respects intended to be illustrative and not restrictive. The scope of the present invention is defined by the appended claims rather than by the foregoing description and is intended to include all modifications within the meaning and range equivalent to the scope of the claims.

EXPLANATION OF REFERENCE NUMERALS

2 Glass lens blanks for polishing
   2a defect-containing layer
   2b lens body (bulk portion)
   2c optical lens surface
   2A main surface (press-molded surface)
   2B main surface (press-molded surface)
   2C side peripheral surface
10 grinding (CG processing) region
11a, 11b grinding (SM processing) region
12 polishing region
20 glass gob
30 glass gob receiving saucer
32 receiving portion
40 melting glass nozzle
50 saucer for softening
52 holding recess portion
54a, 54b release agent nozzle
60a, 60b release agent
70 mold apparatus
72 lower mold
73 barrel mold
74 upper mold
X conveying direction

What is claimed is:

1. A glass lens blank for polishing, comprising at least a main surface that is a press-molded surface,
   wherein a defect-containing layer formed on the main surface has a thickness of 50 µm or less, and
   the main surface has a surface roughness Rz of 12 µm or more.

2. The glass lens blank according to claim 1, wherein the main surface has a surface roughness Rz of 14 µm or more.

3. A method of manufacturing an optical lens wherein an optical lens is obtained by performing a spherical grinding processing, a smoothing processing and a polishing processing on the glass lens blank for polishing according to claim 1, wherein the smoothing processing is performed using a resin-bonded grindstone without using a metal-bonded grindstone.

4. A method of manufacturing an optical lens wherein the optical lens is obtained by performing a smoothing processing and a polishing processing, without performing a spherical grinding processing, on the glass lens blank for polishing according to claim 1.

5. The glass lens blank according to claim 1, wherein the main surface has a surface roughness Rz of 20 µm or more.

6. The glass lens blank according to claim 1, wherein the main surface has a surface roughness Rz of 25 µm or more.

7. The glass lens blank according to claim 1, wherein the main surface has a surface roughness Rz of 50 µm or less.

8. The glass lens blank according to claim 1, wherein the main surface has a surface roughness Rz of 40 µm or less.

9. The glass lens blank according to claim 1, wherein the main surface has a surface roughness Rz of 30 µm or less.

10. The glass lens blank according to claim 1, wherein the defect-containing layer to be formed on the main surface has a thickness of 30 µm or less.

11. The glass lens blank according to claim 1, wherein the defect-containing layer to be formed on the main surface has a thickness of 20 µm or less.

12. The glass lens blank according to claim 1, wherein the defect-containing layer to be formed on the main surface has a thickness of 15 µm or less.

13. The glass lens blank according to claim 1 having a weight of 5 grams or more.

14. The glass lens blank according to claim 1 having a lens diameter of 30 mm or more.

15. A method of manufacturing a glass blank for polishing, comprising the steps of:
   receiving a molten glass from a nozzle comprising a mold;
   molding the molten glass with the mold to obtain a glass gob;
   reheating the glass gob to a viscosity from $10^4$ to $10^6$ dPa·s under an air atmosphere while maintaining a surface state thereof; and
   press-molding the reheated glass gob with a mold for press-molding under an air atmosphere, thereby obtaining a glass-molded article having a press-molded surface in at least a main surface thereof,
   wherein a defect-containing layer formed on the main surface of the glass-molded article obtained by the press-molding step has a thickness of 50 µm or less, and the main surface has a surface roughness Rz of 12 µm or more.

16. The method according to claim 15, further comprising a step of applying a release agent to at least any one surface of the glass gob before the reheating step, and holding recesses for placing the glass gob therein during the reheating step.

17. The method according to claim 15, wherein a molding surface of the mold has a surface roughness Rz of 12 µm to 50 µm.

* * * * *